(12) United States Patent
Takanashi

(10) Patent No.: US 11,403,057 B2
(45) Date of Patent: Aug. 2, 2022

(54) INFORMATION PROCESSING DEVICE, INFORMATION PROCESSING METHOD, AND INFORMATION PROCESSING PROGRAM

(71) Applicant: SONY CORPORATION, Tokyo (JP)

(72) Inventor: Shogo Takanashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/757,942

(22) PCT Filed: Sep. 11, 2018

(86) PCT No.: PCT/JP2018/033645
§ 371 (c)(1),
(2) Date: Apr. 21, 2020

(87) PCT Pub. No.: WO2019/087577
PCT Pub. Date: May 9, 2019

(65) Prior Publication Data
US 2020/0326897 A1 Oct. 15, 2020

(30) Foreign Application Priority Data

Oct. 31, 2017 (JP) .............................. JP2017-211117

(51) Int. Cl.
*G06F 3/14* (2006.01)
*H04N 21/422* (2011.01)

(52) U.S. Cl.
CPC ..... *G06F 3/1423* (2013.01); *H04N 21/42204* (2013.01)

(58) Field of Classification Search
CPC ......... A61B 8/469; A61B 8/5207; A61B 8/00; G06T 2207/20104; H04N 19/17; H04N 21/42204; H04N 7/18; G06F 3/1423; G06F 3/1431; G09B 5/00; G09B 5/02; G09G 5/00; G09G 5/14; G09G 2310/04; G09G 2320/0686; G09G 2352/00; G09G 2354/00; G09G 2360/04; G09G 2370/022; G09G 3/002; G09G 2380/06; G09G 2380/10
See application file for complete search history.

(56) References Cited

U.S. PATENT DOCUMENTS 10,283,088 B2 * 5/2019 Ban ........................ A61B 6/463
10,639,415 B2 * 5/2020 Yi .......................... A61M 5/007
(Continued)

FOREIGN PATENT DOCUMENTS

CN 101309647 A 11/2008
CN 103248855 A 8/2013
(Continued)

OTHER PUBLICATIONS

International Search Report dated Dec. 4, 2018 in PCT/JP2018/033645 filed on Sep. 11, 2018, 2 pages.
Extended European Search Report dated Jul. 3, 2020 in corresponding European Patent Application No. 18872302.7, 9 pages.

*Primary Examiner* — Paulos M Natnael
(74) *Attorney, Agent, or Firm* — Oblon, McClelland, Maier & Neustadt, L.L.P.

(57) ABSTRACT

An information processing device sets a region of interest in an imaging region and determines a region to be displayed from the region of interest according to a state of an object.

19 Claims, 28 Drawing Sheets

(56) References Cited

U.S. PATENT DOCUMENTS

| | | | |
|---|---|---|---|
| 2008/0262354 A1* | 10/2008 | Yoshida | A61B 8/5238 |
| | | | 600/443 |
| 2010/0002071 A1 | 1/2010 | Ahiska | |
| 2010/0225765 A1 | 9/2010 | Kadogawa | |
| 2013/0169782 A1* | 7/2013 | Choi | A61B 5/0077 |
| | | | 348/77 |
| 2014/0340404 A1* | 11/2014 | Wang | G06T 19/006 |
| | | | 345/427 |
| 2015/0141822 A1* | 5/2015 | Miyauchi | A61B 8/461 |
| | | | 600/438 |
| 2016/0067402 A1 | 3/2016 | Yl | |
| 2019/0037173 A1* | 1/2019 | Lee | H04W 76/15 |
| 2019/0050664 A1* | 2/2019 | Yang | G06T 19/006 |
| 2021/0127087 A1* | 4/2021 | Yoshimochi | H04N 5/232 |

FOREIGN PATENT DOCUMENTS

| | | | |
|---|---|---|---|
| CN | 104334086 A | | 2/2015 |
| JP | 2006-162692 A | | 6/2002 |
| JP | 2003-143596 A | | 5/2003 |
| JP | 2005-33570 A | | 2/2005 |
| JP | 2006-186939 A | | 7/2006 |
| JP | 2007-25425 A | | 2/2007 |
| JP | 2007-81553 A | | 3/2007 |
| JP | 2007081553 A | * | 3/2007 |
| JP | 2010-206475 A | | 9/2010 |
| JP | 2012-185555 A | | 9/2012 |
| WO | 2017/181429 A1 | | 10/2017 |

\* cited by examiner

FIG.17
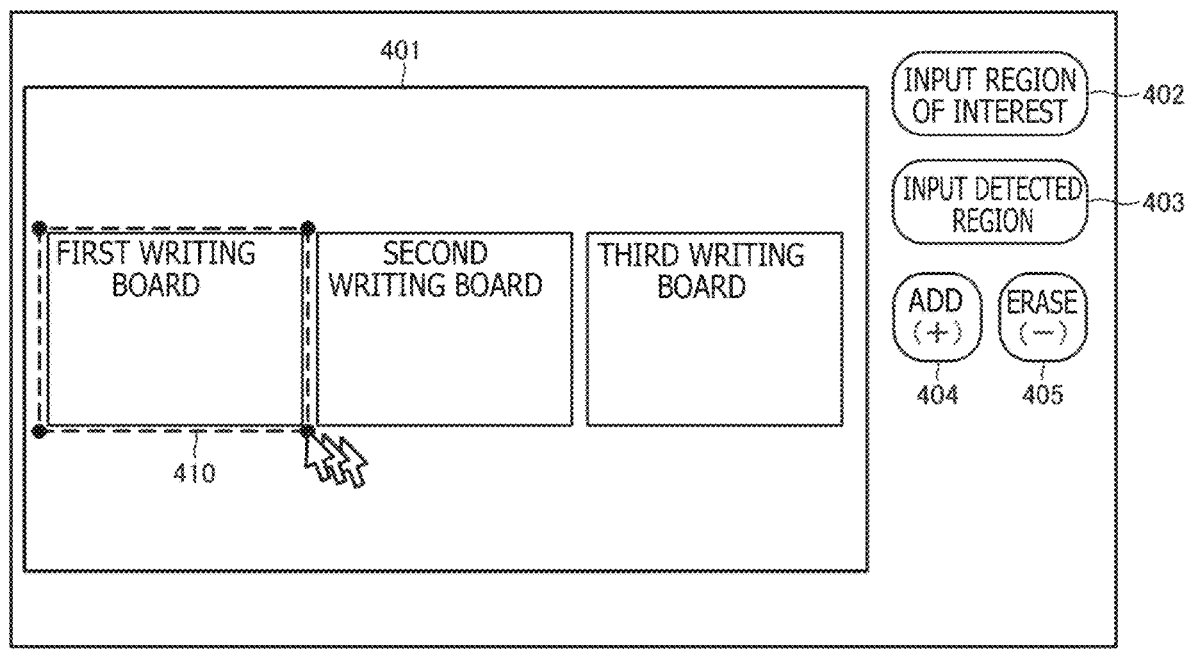
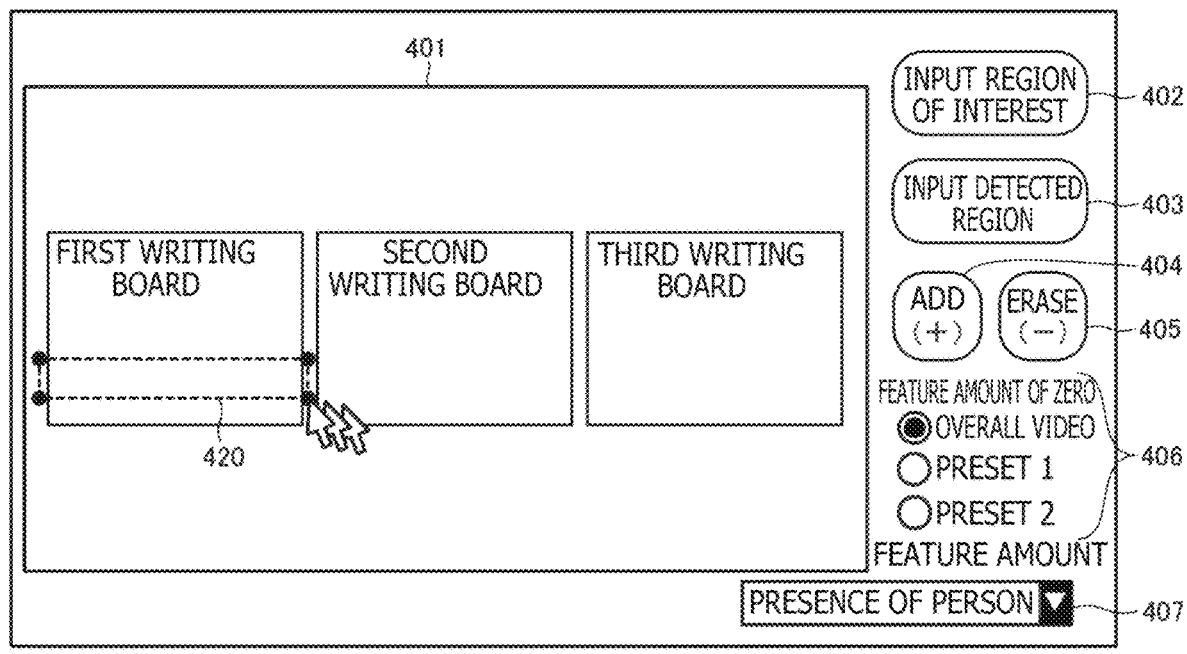

FIG.20
A
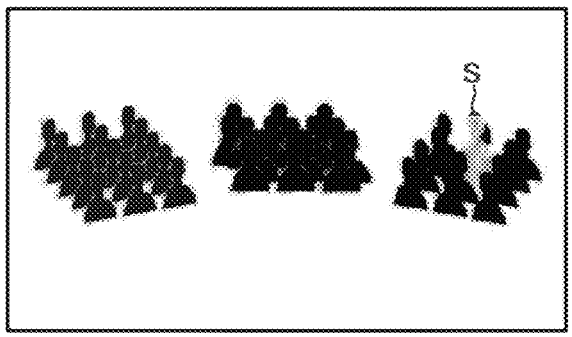
B
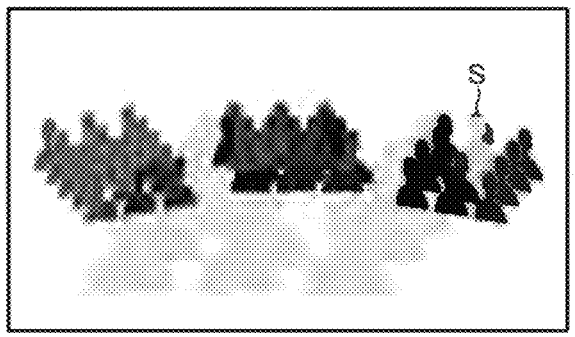
C
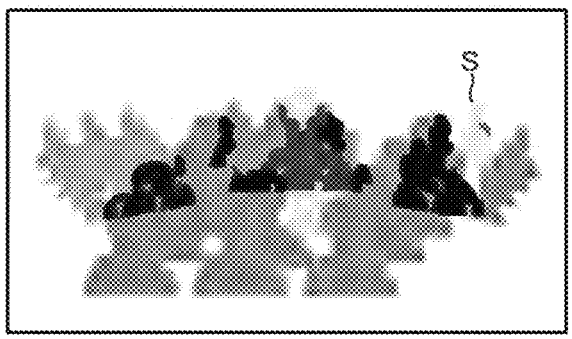
D
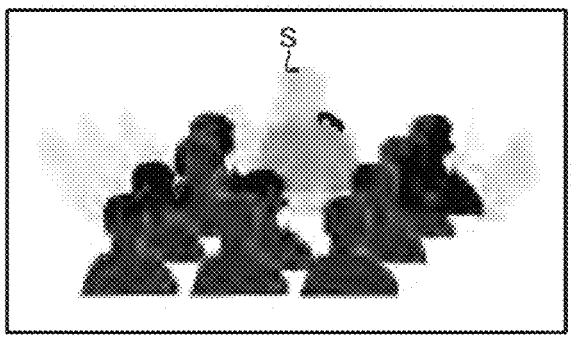
E
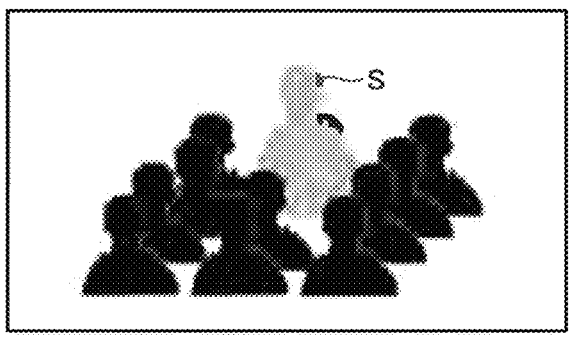

FIG.22
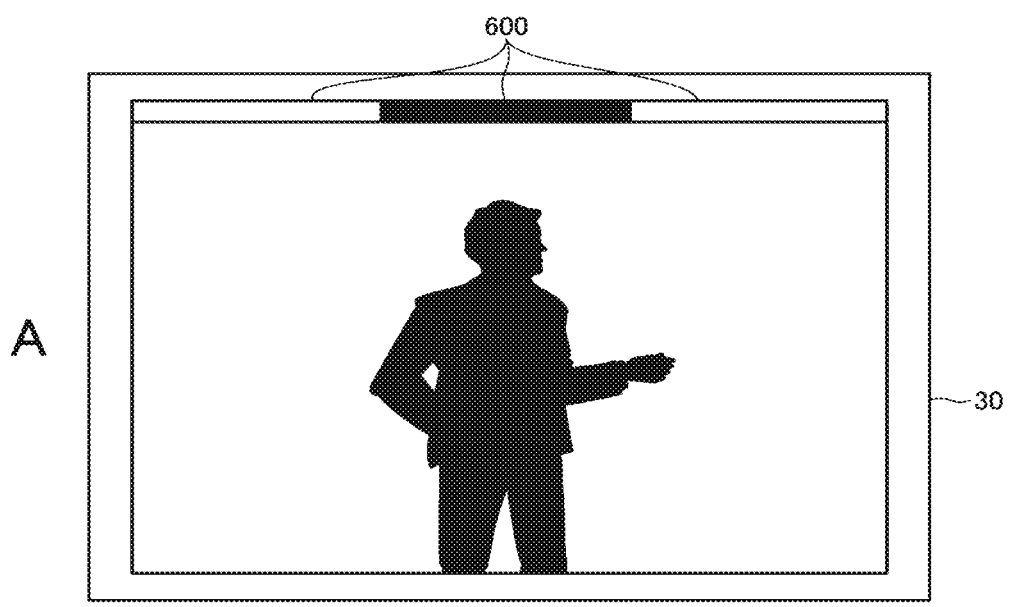
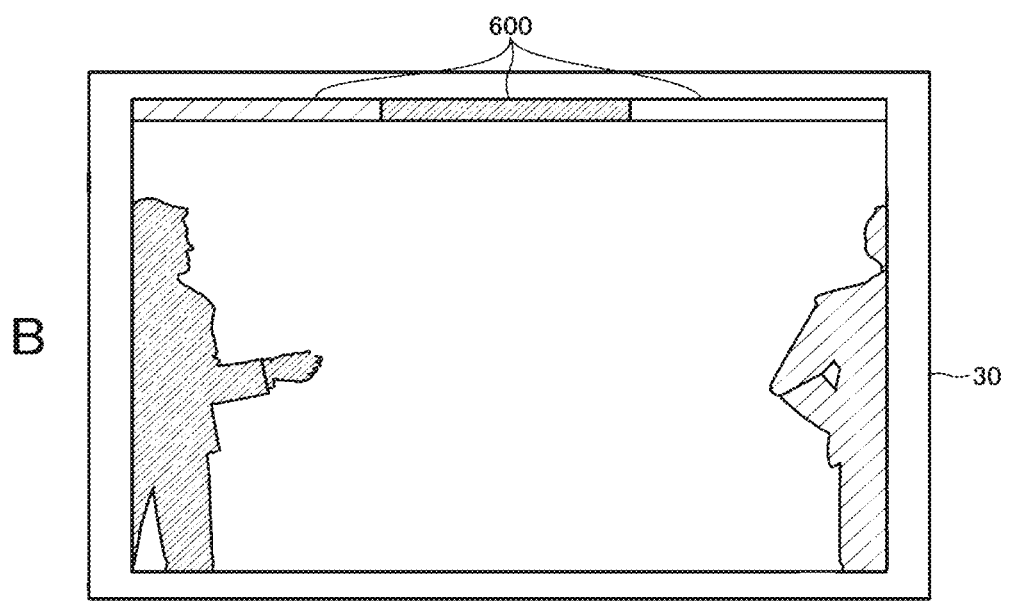

INFORMATION PROCESSING DEVICE, INFORMATION PROCESSING METHOD, AND INFORMATION PROCESSING PROGRAM

TECHNICAL FIELD

The present technology relates to an information processing device, an information processing method, and an information processing program.

BACKGROUND ART

A scheme for extracting information concerning a position, a moving direction, and a motion of an object and changing over plural videos on the basis of the information has been proposed in a conventional technology. Further, there is also proposed a method of transition of videos on the basis of panning and tilting operations in response to a user input.

CITATION LIST

Patent Literature

[PTL 1]
JP 2013-17071A

SUMMARY

Technical Problems

With the method of Patent Document 1, however, the panning and tilting operations are necessary to transition videos and the video transition is not automatically controlled on the basis of a subject in the videos. It is also necessary to provide a mechanism and control for panning and tilting motions for introducing the method, and thus, the technology of Patent Document 1 has a problem that it is not easy to introduce such a method.

The present technology has been achieved in light of such problems, and an object of the present technology is to provide an information processing device, an information processing method, and an information processing program capable of switchably displaying plural regions in a video according to a state in the video.

Solution to Problems

To solve the abovementioned problems, a first technology is an information processing device that sets a region of interest in an imaging region and that determines a region to be displayed from the region of interest according to a state of an object.

Moreover, a second technology is an information processing method including setting a region of interest in an imaging region and determining a region to be displayed from the region of interest according to a state of an object.

Furthermore, a third technology is an information processing program causing a computer to execute an information processing method including setting a region of interest in an imaging region and determining a region to be displayed from the region of interest according to a state of an object.

Advantageous Effect of Invention

According to the present technology, it is possible to switchably display plural regions in a video according to a state in the video. It is noted that the advantages are not always limited to those described herein and may be any of the advantages described in the specification.

BRIEF DESCRIPTION OF DRAWINGS

FIG. 17 depicts diagrams depicting an example of a user interface.

FIG. 20 depicts diagrams depicting transition of a displayed video.

FIG. 22 depicts diagrams depicting icons in the modification.

DESCRIPTION OF EMBODIMENTS

Embodiments of the present technology will hereinafter be described with reference to the drawings. It is noted that description will be given in the following order.
<1. First embodiment>
[1-1. Configuration of video display system]
[1-2. Configuration of information processing device]
[1-3. Processes by information processing device]
<2. Second Embodiment>
<3. Third embodiment>
<4. Example of user interface>
<5. Specific examples of mode of use of present technology>
[5-1. First mode of use]
[5-2. Second mode of use]
<6. Modifications>
<7. Application examples>

1. First Embodiment

[1-1. Configuration of Video Display System]

A video display system 10 including an information processing device 100 according to the present technology includes an imaging device 20, the information processing device 100, and a display device 30. The imaging device 20, the information processing device 100, and the display device 30 are connected to one another by, for example, a local area network (LAN) cable or a Universal Serial Bus (USB) cable. It is noted that connection of the imaging device 20, the information processing device 100, and the display device 30 is not limited to wired connection and may be wireless communication such as Wi-Fi or a wireless LAN.

Figure 1:
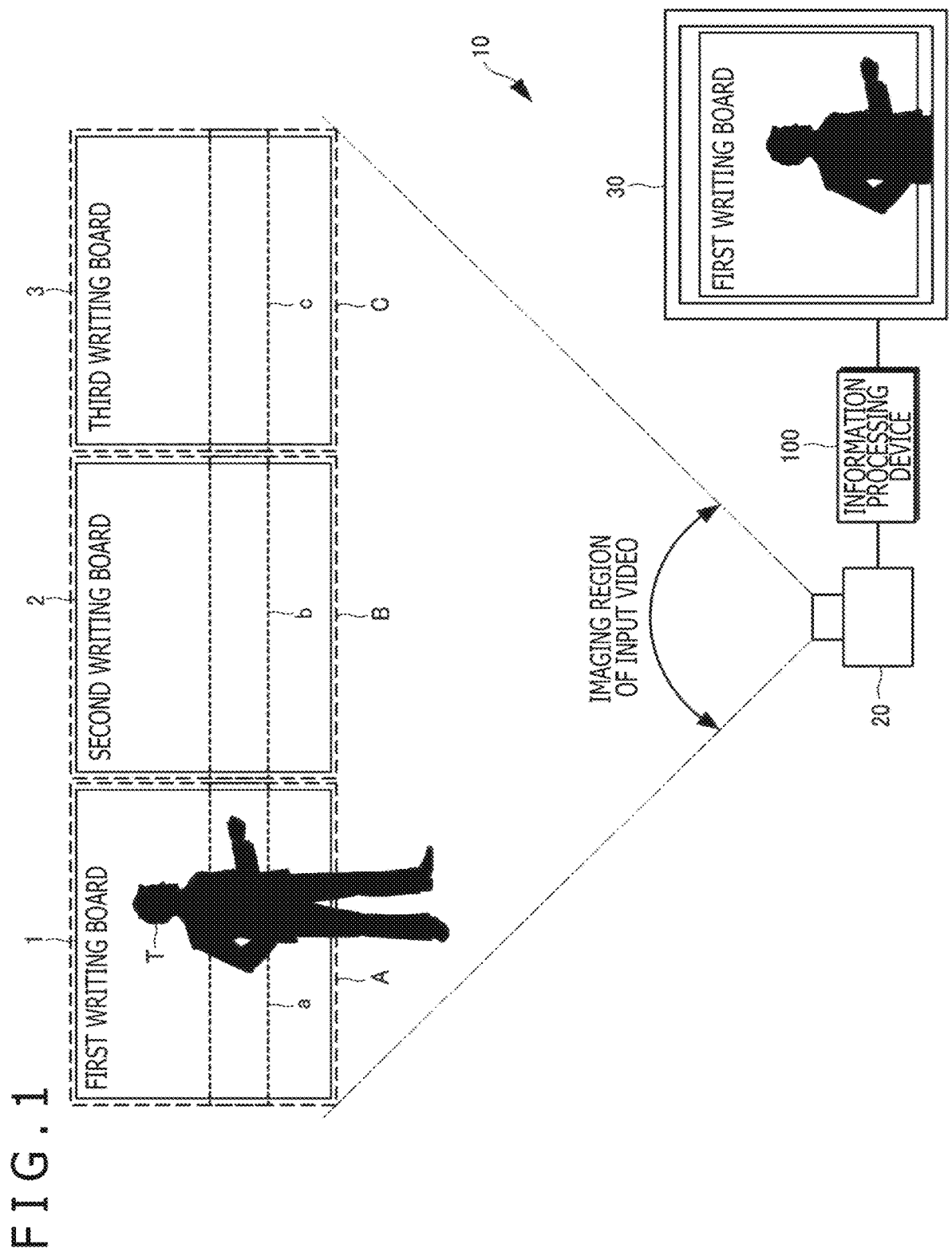
FIG. 1 is a diagram depicting a configuration of a video display system.

The video display system 10 is configured such that the information processing device 100 processes a video captured by one imaging device 20 and input to the information processing device 100 (hereinafter the video is referred to as an "input video"), according to a position, a motion, and the like of an object, and displays a predetermined region in the input video on the display device 30. The input video needs to be a video that contains all subjects to be displayed on the display device 30. As depicted in FIG. 1, in the present embodiment, the imaging device 20 is provided to contain all of three writing boards, which is a first writing board 1, a second writing board 2, and a third writing board 3, within an angle of view (imaging region) so as to display the first writing board 1, the second writing board 2, and the third writing board 3 on the display device 30. In addition, a person T giving a lecture using the writing boards is assumed as an object in claims and any one of the three writing boards is displayed on the display device 30 to fit a position and a motion of the person T.

In the first embodiment, in a case in which the person T as the object is standing in front of the first writing board 1, the video display system 10 displays the first writing board 1 on the display device 30. Moreover, in a case in which the person T moves and is standing in front of the second writing board 2, the video display system 10 displays the second writing board 2 on the display device 30. Furthermore, in a case in which the person T is standing in front of the third writing board 3, the video display system 10 displays the third writing board 3 on the display device 30. It is noted that the writing boards are board-like members such as blackboards or whiteboards on which characters, charts, pictures, and the like can be drawn. While the present embodiment is described with the writing boards and a person such as a lecturer standing in front of the writing boards in this way taken as an example, the present technology is not limited to such a mode of use.

The imaging device 20 is a digital video camera capable of capturing a video or an electronic device such as a personal computer, a tablet terminal, or a smart phone equipped with a function capable of capturing a video. As depicted in FIG. 1, the imaging device 20 is provided to be capable of containing the three writing boards which are the first writing board 1, the second writing board 2, and the third writing board 3 as subjects to be displayed on the display device 30 within the angle of view without performing panning and tilting motions. The imaging device 20 continuously supplies data regarding the captured input video to the image processing device 100 when a user uses the video display system 10.

The display device 30 is a display device configured by, for example, a Liquid Crystal Display (LCD), a Plasma Display Panel (PDP), or an organic Electro Luminescence (EL) panel. A predetermined region in the input video captured by the imaging device 20 is displayed on the display device 30 according to a position, a motion, and the like of the object.

The information processing device 100 is configured such that the input video captured by the imaging device 20 is subjected to a video process according to the present technology, the predetermined region within the input video is determined as a region to be displayed, and the predetermined region is displayed on the display device 30. The information processing device 100 is capable of processing the input video captured by the imaging device 20 in real time or capable of processing a video content after completion with imaging.

The information processing device 100 is configured with, for example, an electronic device such as a personal computer, a tablet terminal, or a smart phone. The information processing device 100 may be configured with a program, and the program may be installed in the electronic device in advance or the program may be distributed by downloading, storing the program in a storage medium or the like, and installed in the electronic device by the user himself/herself. Furthermore, the information processing device 100 may be realized by a combination of dedicated devices, circuits, or the like by hardware having a function as the information processing device 100 in addition to being realized by the program. It is noted that the imaging device 20 may have a function as the information processing device 100 or the display device 30 may have a function as the information processing device 100, and the imaging device 20 and the display device 30 may be connected directly to each other.

[1-2. Configuration of Information Processing Device]

A configuration of the information processing device 100 will next be described with reference to the block diagram of FIG. 2. The information processing device 100 includes a video input section 110, a region setting section 120, a feature amount acquisition section 130, a feature amount ratio calculation section 140, a regions-of-interest combining section 150, and a video output section 160.

Data regarding the input video supplied from the imaging device 20 is input to the video input section 110, and the video input section 110 supplies the data regarding the input video to the region setting section 120. It is noted that a series of continuous frame images configuring the input video is sequentially supplied from the video input section 110 to the region setting section 120 according to an order of reproduction. A series of processes by the region setting section 120 and the following section is performed on the series of continuous frame images configuring the input video. The processes are performed on each of the frame images and the processed frame images (hereinafter, referred to as "combined frame images") are sequentially supplied to the display device 30. By displaying the series of continuous combined frame images according to the order of reproduction on the display device 30, the video processed by the information processing device 100 is displayed on the display device 30.

The region setting section 120 sets regions of interest and detected regions determined in advance by a user's input to each of the frame images configuring the input video. The user needs to input the regions of interest and the detected regions to the information processing device 100 before using the video display system 10. A method of inputting the regions of interest and the detected regions and an input user interface will be described later.

The regions of interest are regions clipped from the input video and displayed on the display device 30, and positions, shapes, sizes, and the number of regions of interest can optionally be determined by the user. As depicted in FIG. 1, it is assumed in the present embodiment that the user determines, in advance, for each of the three writing boards, a region of interest A to contain the first writing board 1, a region of interest B to contain the second writing board 2, and a region of interest C to contain the third writing board 3.

Furthermore, the detected regions are set to each frame image to correspond to those regions of interest, respectively. As depicted in FIG. 1, the user determines, in advance, a detected region a for the region of interest A, a detected region b for the region of interest B, and a detected region c for the region of interest C, and the region setting section 120 sets the detected regions a, b, and c to each of the frame images. Each detected region is a region that is set per region of interest so that the detected region corresponds to the region of interest, and that is used to detect a feature amount on the basis of which it is determined which region of interest is to be displayed on the display device 30. An internal state of the detected region grasped by this feature amount corresponds to a "state" in the claims. It is noted that each detected region is not necessarily required to overlap the corresponding region of interest, and a position, a shape, and a size of the detected region can freely be determined by the user as long as one region of interest corresponds to one detected region.

In the first embodiment, it is determined which region of interest is to be displayed on the display device 30 depending on the position of the person T, and thus, as depicted in FIG. 1, it is assumed that the user determines, in advance, each detected region as a region ranging from one end to the other end of the corresponding region of interest in a lateral direction. This is because the person T moves in the lateral direction in front of the writing boards. The lateral direction is identical to a direction in which the person T is movable by walking and a width direction of the writing boards.

In the present embodiment, in a case in which the person T is standing in front of the first writing board 1, that is, in front of the detected region a, the region of interest A is clipped from the input video and displayed on the display device 30. In a case in which the person T is standing in front of the second writing board 2, that is, in front of the detected region b, the region of interest B is clipped from the input video and displayed on the display device 30. In a case in which the person T is standing in front of the third writing board 3, that is, in front of the detected region c, the region of interest C is clipped from the input video and displayed on the display device 30.

Information indicating the regions of interest and the detected regions set by the region setting section 120 are supplied, together with the input video data, to the feature amount acquisition section 130.

Figure 2:
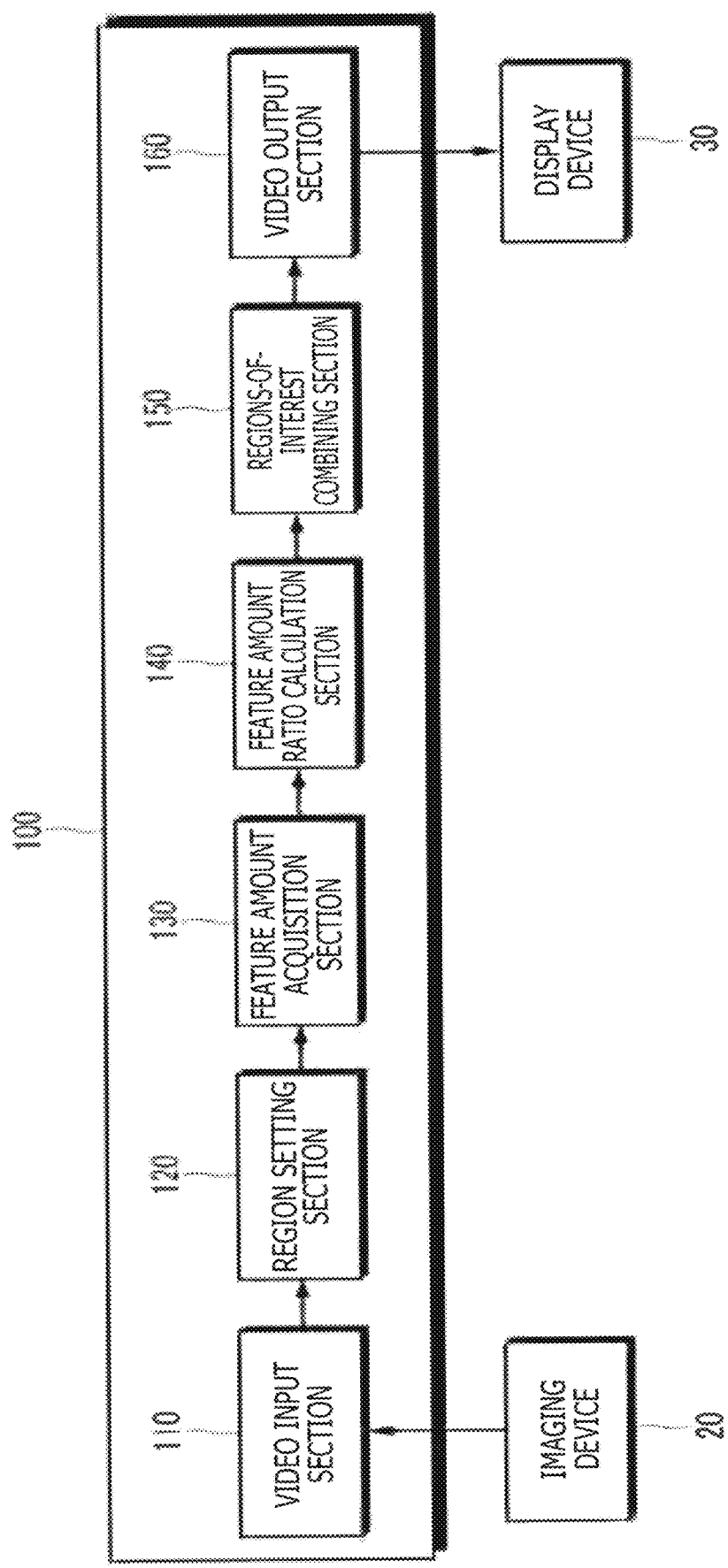
FIG. 2 is a block diagram depicting a configuration of an information processing device according to a first embodiment.

Reference is made back to FIG. 2. The feature amount acquisition section 130 acquires a feature amount from the detected regions. The feature amount is used to determine which region of interest is to be determined as the region to be displayed on the display device 30. A first example of the feature amount is the number of pixels configuring a region where the person T is present within each detected region. The feature amount acquisition section 130 first detects the region where the person T is present from each frame image to be processed using a well-known subject detection technology or the like. As a subject detection method, an object detection technology based on template matching, a matching method based on luminance distribution information regarding the subject, a method based on a feature amount of a skin color part or a person's face contained in the image, or the like may be used. Furthermore, these schemes may be combined to enhance recognition accuracy.

The feature amount acquisition section 130 then acquires the feature amount by measuring the number of pixels configuring the region where the person T is present within each detected region. The feature amount acquired by the feature amount acquisition section 130 is supplied, together with the input video data, to the feature amount ratio calculation section 140.

The feature amount ratio calculation section 140 calculates a proportion of the feature amount of the person T in each detected region with respect to a total detected region that is a combination of all the detected regions, using the feature amount acquired per detected region. This proportion is calculated with, for example, a proportion of the total number of pixels of the person T in the total detected region assumed as 1.0. The proportion of the feature amount calculated by the feature amount ratio calculation section 140 is supplied, together with the input video data and information regarding the regions of interest and the detected regions, to the regions-of-interest combining section 150.

Figure 3:
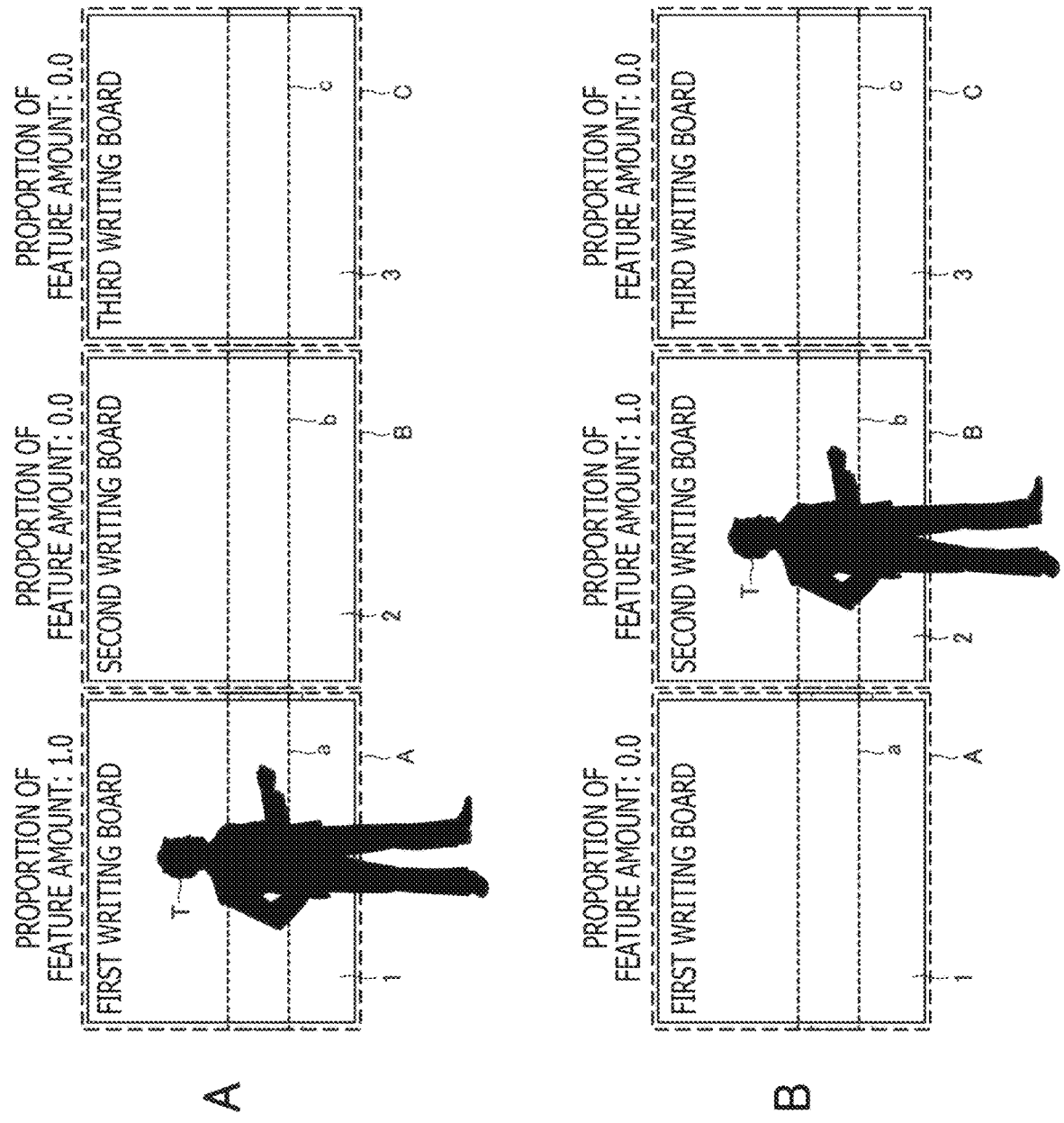
FIG. 3 depicts explanatory diagrams of calculation of proportions of a feature amount.

For example, as depicted in FIG. 3A, in a case in which the person T is standing in front of the first writing board 1 and the feature amount of the person T is present only in the detected region a, then the proportion of the feature amount accounted for in the detected region a with respect to the total detected region is 1.0, and the proportion of the feature amount in each of the detected regions b and c is zero. Furthermore, as depicted in FIG. 3B, in a case in which the person T is standing in front of the second writing board 2 and the feature amount of the person T is present only in the detected region b, then the proportion of the feature amount accounted for in the detected region b with respect to the total detected region is 1.0, and the proportion of the feature amount in each of the detected regions a and c is zero. Moreover, in a case in which the person T is standing in front of the third writing board 3 and the feature amount of the person T is present only in the detected region c, then the proportion of the feature amount accounted for in the detected region c with respect to the total detected region is 1.0, and the proportion of the feature amount in each of the detected regions a and b is zero.

Figure 4:
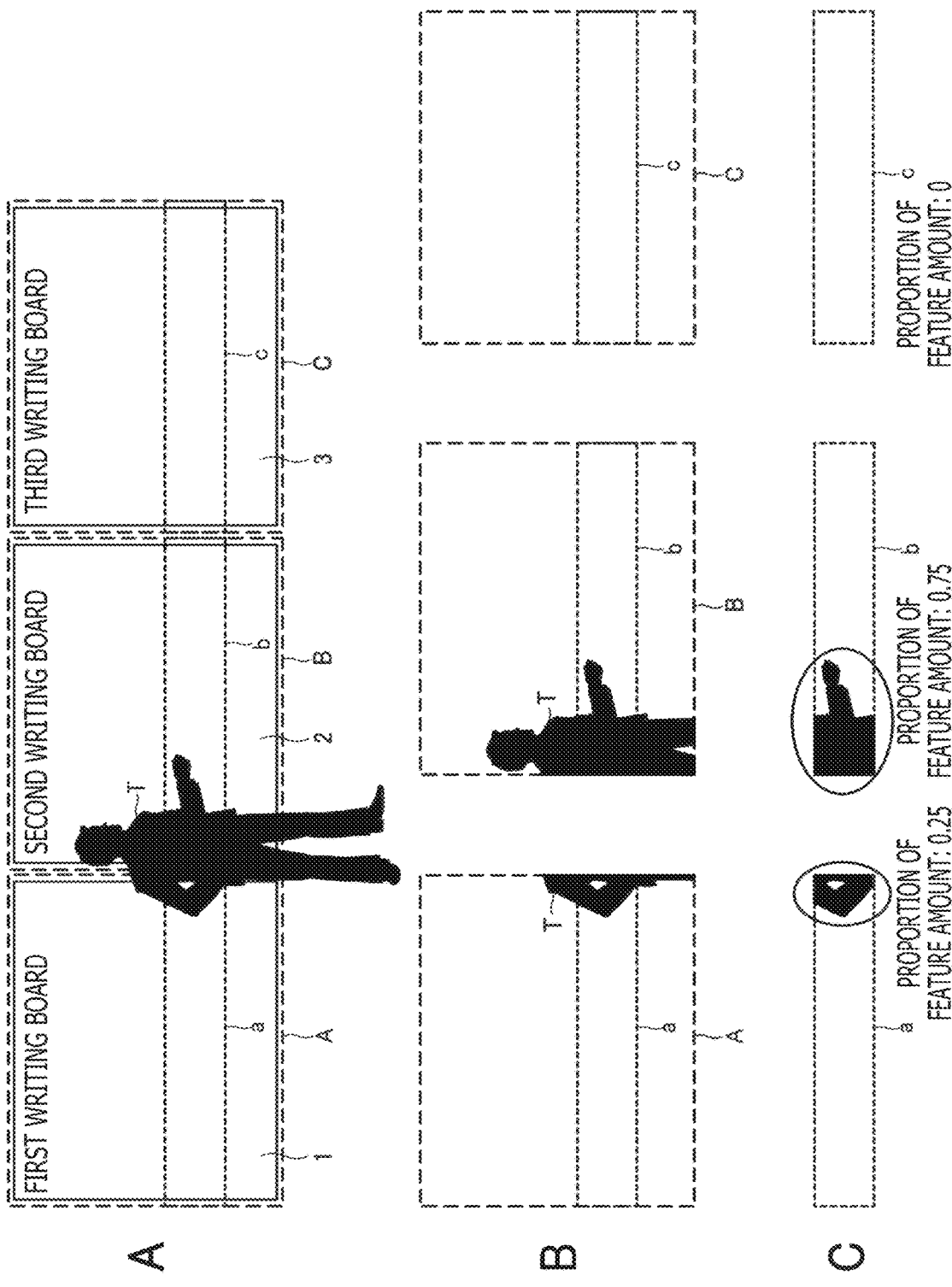
FIG. 4 depicts explanatory diagrams of calculation of proportions of the feature amount.

Furthermore, in a case in which the person T is present to stand in front of both the first writing board 1 and the second writing board 2 as depicted in FIG. 4A, this means that the person T is present to stand in front of both the regions of interest A and B and further to stand in front of both the detected regions a and b as depicted in FIG. 4B. FIG. 4B illustrates the regions of interest A and B separately and the detected regions a and b separately. In this case, the feature amount is present in both the detected regions a and b. If it is assumed that the proportion of the total number of pixels of the person T present in the total detected region is 1.0, the number of pixels of the person T in the detected region a is 2500, and the number of pixels of the person T in the detected region b is 7500, and then the proportion of the feature amount is "0.25 in the detected region a" and "0.75 in the detected region b" as depicted in FIG. 4C. In this way, the proportions of the feature amount are calculated from the proportion of the number of pixels. It is noted that the proportion of the feature amount in the detected region c where the person T is not present is zero. In this way, the feature amount ratio calculation section 140 calculates the proportion of the feature amount in each detected region.

The regions-of-interest combining section 150 clips all the regions of interest present in the frame images configuring the input video, and combines all the regions of interest on the basis of the proportion of the feature amount in each detected region calculated by the feature amount ratio calculation section 140. By supplying the combined frame images created by a combining process performed by the regions-of-interest combining section 150 to the display device 30 and displaying the combined frame images on the display device 30 according to the order of reproduction, the video processed by the information processing device 100 is displayed.

Combining of the regions of interest will be described on the basis of the example of FIG. 1. Combining of the regions of interest is performed by combining the regions of interest A, B, and C on the basis of the proportions of the feature amount for all pixels configuring each region of interest. First, the regions-of-interest combining section 150 clips the regions of interest A, B, and C from each frame image.

Next, the regions-of-interest combining section 150 combines the regions of interest on the basis of the proportion of the feature amount in the detected region corresponding to each region of interest. It is assumed herein that the proportion of the feature amount in the detected region a corresponding to the region of interest A is L, the proportion of the feature amount in the detected region b corresponding to the region of interest B is M, and the proportion of the feature amount in the detected region c corresponding to the region of interest C is N.

Figure 5:
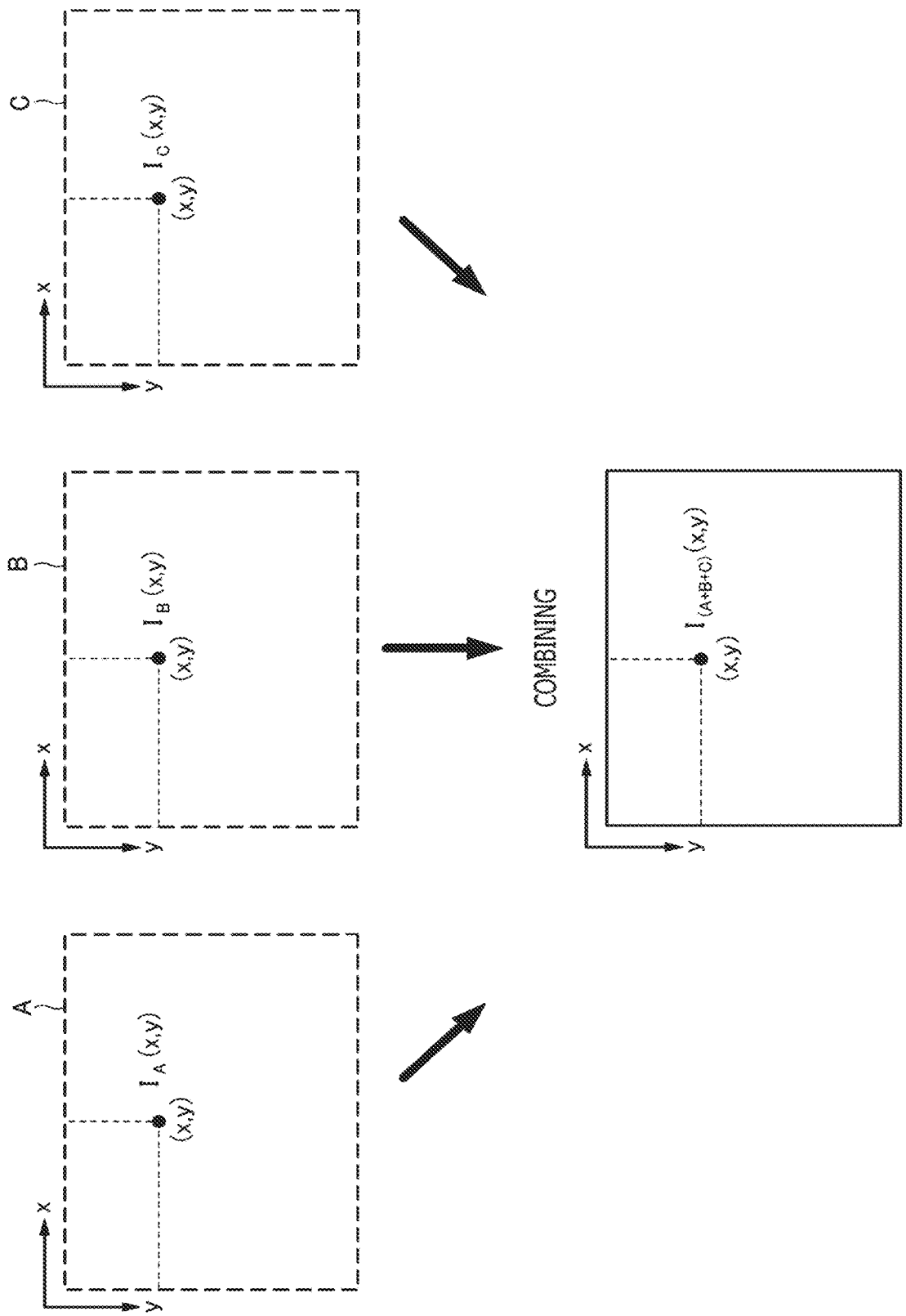
FIG. 5 depicts explanatory diagrams of a combining process.

As depicted in FIG. 5, it is also assumed that a pixel value at a point (x,y) within the region of interest A is IA(x,y), a pixel value at the same point (x,y) within the region of interest B is IB(x,y), and a pixel value at the same point (x,y) within the region of interest C is IC(x,y). In this case, a pixel value I(A+B+C)(x,y) at the same point (x,y) in each combined frame image finally output to the display device 30 can be expressed by the following Equation 1.

$$I(A+B+C)(x,y) = L \cdot IA(x,y) + M \cdot IB(x,y) + N \cdot IC(x,y) \quad \text{[Math. 1]}$$

Through this process, it is possible to obtain a state in which all the regions of interest are combined according to the proportions of the feature amount for the pixel at the point (x,y). Performing this process on all the pixels configuring the regions of interest makes it possible to obtain a combined frame image by combining the regions of interest A, B, and C according to the proportions of the feature amount.

As depicted in, for example, FIG. 1, in the case in which the person T is present in front of the first writing board 1, that is, in front of the detected region a, the proportions of the feature amount in the detected regions to the total detected region are as follows.

Detected region a: proportion of feature amount L=1.0
Detected region b: proportion of feature amount M=0.0
Detected region c: proportion of feature amount N=0.0

By substituting the proportions of the feature amount into Equation 1, the pixel value I(A+B+C)(x,y) at the point (x,y) in the combined frame image is expressed by the following Equation 2.

$$I(A+B+C)(x,y) = \quad \text{[Math. 2]}$$
$$1 \cdot IA(x,y) + 0 \cdot IB(x,y) + 0 \cdot IC(x,y) = IA(x,y)$$

Since the proportions of the feature amount in the detected regions other than the detected region a are zero, a combining result of the same point (x,y) in the regions of interest A, B, and C is the same as that of the point (x,y) in the region of interest A. Performing this process on all the pixels configuring each region of interest makes it possible to obtain a combined frame image by combining the regions of interest A, B, and C. In a case of this example, a combining result of the regions of interest A, B, and C is the same as that of the region of interest A, that is, the combined frame image is the same as the region of interest A. This combined frame image is transmitted to the display device 30. In the case in which the person T is standing in front of the detected region a, only the region of interest A is thereby displayed on the display device 30. Likewise, in the case in which the person T is standing in front of the detected region b, only the region of interest B is displayed on the display device 30, and in the case in which the person T is standing in front of the detected region c, only the region of interest C is displayed on the display device 30.

Next, the case in which the person T is present to stand in front of two detected regions will be described. A case in which the person T moves from one region of interest to another region of interest, for example, a case in which the person T moves from the region of interest A to the region of interest B will be considered. In this case, until completion with movement to the region of interest B, the person T is present to stand in front of both of the detected regions a and b as depicted in FIG. 4A.

As depicted in FIG. 4B, in the case in which the person T is present to stand in front of both of the detected regions a and b, it is assumed that the proportions of the feature amount in the detected regions with respect to the total detected region are as follows, as depicted in FIG. 4C.

Detected region a: proportion of feature amount L=0.25
Detected region b: proportion of feature amount M=0.75
Detected region c: proportion of feature amount N=0.0

It is noted that since the person T is not present in the detected region c, the proportion of the feature amount in the detected region c is zero. Furthermore, it is assumed that the pixel value at the point (x,y) within the region of interest A is IA(x,y), the pixel value at the same point (x,y) within the region of interest B is IB(x,y), and the pixel value at the same point (x,y) within the region of interest C is IC(x,y). By substituting the proportions of the feature amount into Equation 1, the pixel value I(A+B+C)(x,y) at the same point (x,y) in the combined frame image is expressed by the following Equation 3.

$$I(A + B + C)(x, y) =$$
$$0.25 \cdot IA(x, y) + 0.75 \cdot IB(x, y) + 0 \cdot IC(x, y) =$$
$$0.25 \cdot IA(x, y) + 0.75 \cdot IB(x, y)$$
[Math. 3]

This means that the point (x,y) in the combined frame image is obtained by combining the pixel at the point (x,y) in the region of interest A and the pixel at the point (x,y) in the region of interest B at proportions of [0.25:0.75]. Since the proportion of the feature amount in the detected region c is zero, the pixel in the region of interest C is not combined with those in the regions of interest A and B.

Figure 6:
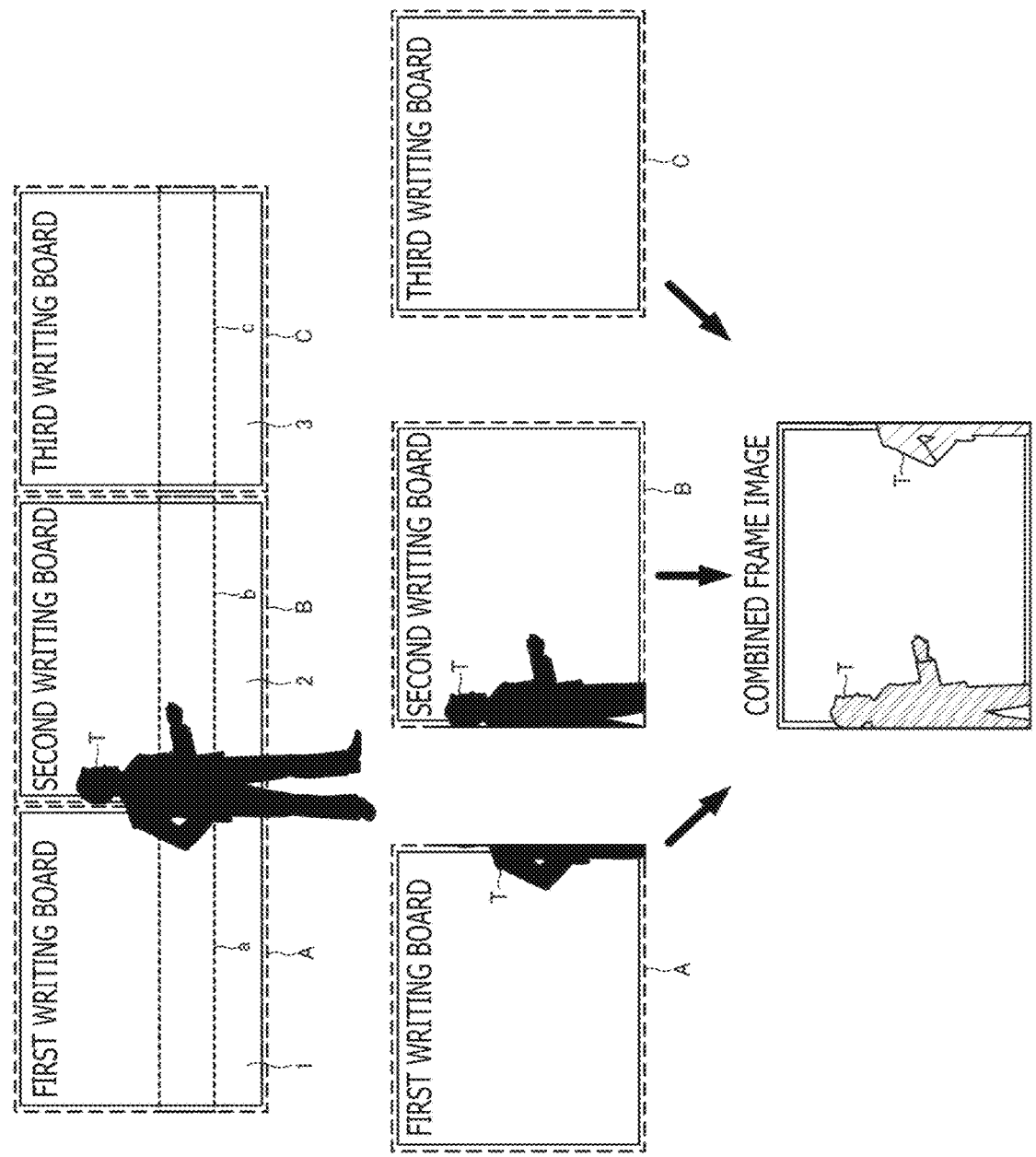
FIG. 6 depicts explanatory diagrams of the combining process.

Performing this process on all the pixels configuring each region of interest makes it possible to obtain combined frame images that are a combining result of the regions of interest A, B, and C. In a case of this example, the combining result of the regions of interest A, B, and C is a result of combining the regions of interest A and B where the person T is present at "0.25:0.75" that is the proportion of the feature amount as depicted in FIG. 6. Therefore, part of the person T is present in the region of interest A and part of the person T is present in the region of interest B within the combined frame image, and the person T has different shades of color to correspond to the proportions of the feature amount. The person T in the region of interest B corresponding to the detected region h and the person T in the region of interest A corresponding to the detected region a are displayed in lighter colors than in the input video, and further, the person T in the region of interest B corresponding to the detected region b higher in the proportion of the feature amount is displayed in a darker color than the person T in the region of interest A corresponding to the detected region a lower in the proportion of the feature amount.

The combined frame image generated in this way is transmitted to the display device 30, and thus, in the case in which the person T is present in front of both the detected regions a and b, a video obtained by combining the regions of interest A and B is displayed on the display device 30.

When the person T moves from the detected region a to the detected region b, the proportion of the feature amount in the detected region a gradually decreases and the proportion of the feature amount in the detected region b gradually increases with a change in the position of the person T, as depicted in FIGS. 7A to 7E. In addition, when the person T completes movement to the detected region b as depicted in FIG. 7E, then the proportion of the feature amount in the detected region b is equal to 1.0, and the proportion of the feature amount in the detected region a is equal to 0.0. When the proportion of the feature amount in the detected region b is 1.0 and the proportion of the feature amount in the detected region a is 0.0, the pixel value I(A+B+C)(x,y) at the point (x,y) in the combined frame image is expressed by the following Equation 4 using Equation 1.

$$I(A+B+C)(x,y)=0+1 \cdot IB(x,y)+0=IB(x,y)$$
[Math. 4]

Figure 7:
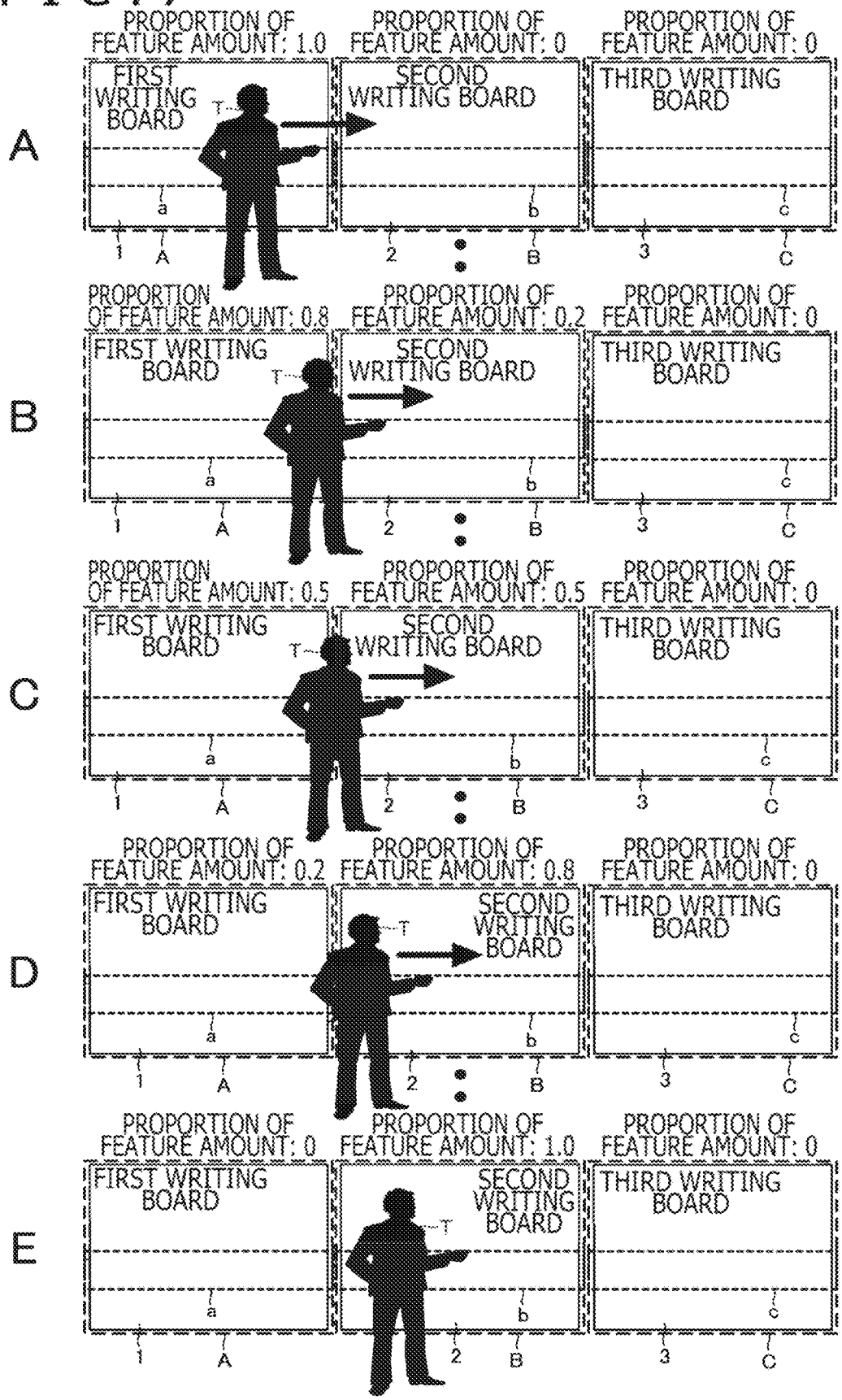
FIG. 7 depicts explanatory diagrams of calculation of proportions of the feature amount.

In this way, the combining result of the same point (x,y) in the regions of interest A, B, and C is the same as that of the point (x,y) in the region of interest B; the combined frame image is the same as the region of interest B. Therefore, only the region of interest B is displayed on the display device 30. While FIG. 7 represents the movement of the person T from the region of interest A to the region of interest B using five figures, acquisition of the feature amount and calculation of the proportions of the feature amount are not performed at such sporadic intervals and are performed for all the continuous frame images.

Performing this combining process on all the series of frame images configuring the video makes it possible to obtain a video gradually and smoothly changing from the region of interest A to the region of interest B to correspond to the movement of the person T from the region of interest A to the region of interest B, that is, a change in the feature amount in the detected regions a and b.

When the person T swiftly moves from the region of interest A to the region of interest B, the proportions of the feature amount in the detected regions a and b change quickly, and thus, changeover from display of the region of interest A to the region of interest B on the display device 30 is quickly carried out. On the other hand, when the person T moves slowly from the region of interest A to the region of interest B, the proportions of the feature amount in the detected regions a and b change slowly, and thus, the changeover from the display of the region of interest A to the region of interest B on the display device 30 is carried out slowly.

The same thing is true for the movement of the person T from the region of interest B to the region of interest C, that from the region of interest C to the region of interest B, and that from the region of interest B to the region of interest A.

It is noted that unless the person T moves from any one of the regions of interest to another region of interest, the feature amount does not change in any of the detected regions, and thus, the region of interest displayed on the display device 30 is not changed over to the other region of interest. In a case in which the person T continues to be present in the region of interest A, the region of interest A is continuously displayed on the display device 30.

Reference is made back to FIG. 2. The video output section 160 sequentially transmits the combined frame images generated by performing the processes described above to the display device 30 according to an order of display. The video processed by the information processing device 100 is thereby displayed on the display device 30. It is noted that the video output section 160 may transmit each processed combined frame image to the display device 30, or may transmit a plurality of combined frame images as video data with a length to some extent to the display device 30.

The information processing device 100 is configured as described so far.

[1-3. Processes by Information Processing Device]

Figure 8:
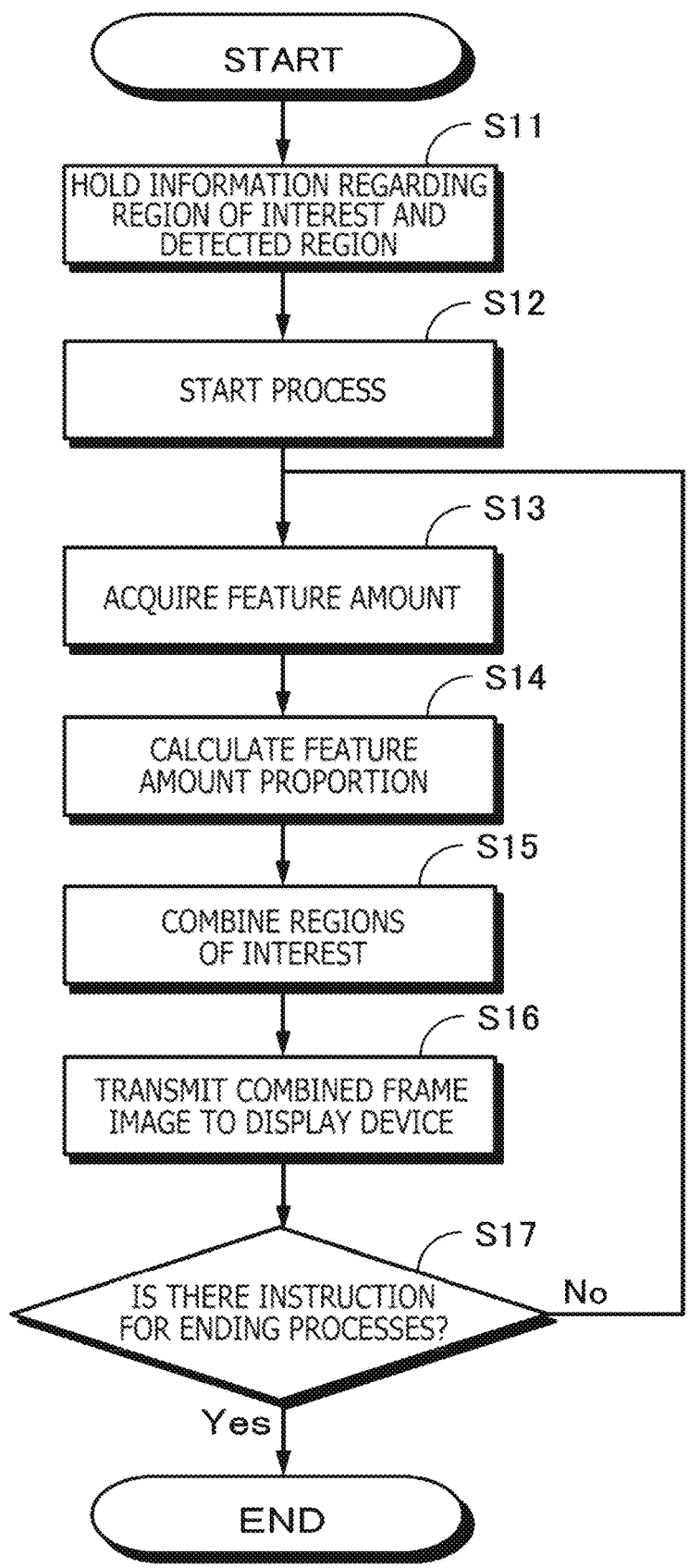
FIG. 8 is a flowchart depicting a flow of processes by the information processing device.

A flow of processes performed by the information processing device 100 will next be described with reference to the flowchart of FIG. 8. First, in Step S22, the information processing device 100 holds information regarding the regions of interest and the detected regions input by the user who uses the video display system 10.

Upon receiving a user's input of an instruction for starting processes, the information processing device 100 next starts a video process in Step S12. The information processing device 100 performs subsequent processes for every frame image configuring the input video supplied from the imaging device 20.

Next, in Step S13, the feature amount acquisition section 130 acquires the feature amount in each detected region and supplies the feature amount to the feature amount ratio calculation section 140. Next, in Step S14, the feature amount ratio calculation section 140 calculates the proportion of the feature amount in each feature amount detected region, and supplies information indicating the feature amount proportion to the regions-of-interest combining section 150.

Next, in Step S15, the regions-of-interest combining section 150 performs the combining process on the regions of interest according to the proportions of the feature amount in the detected regions, thereby creating a combined frame image. In Step S16, the video output section 160 then transmits the combined frame image to the display device 30. By displaying the combined frame images as a series of frame images configuring the video on the display device 30, the video is displayed on the display device 30.

Next, in Step S17, the information processing device 100 determines whether or not there is a user's input giving an instruction on an end of the processes. Unless there is the user's input giving an instruction on the end of the processes, the information processing device 100 repeats Steps S13 to S17 and continuously displays the video on the display device 30. In Step S17, in the case of presence of the user's input to instruct the information processing device 100 to end processes, the information processing device 100 ends the processes and ends to display the video on the display device 30.

The first embodiment of the present technology performs the processes as described above. According to the first embodiment, it is possible to display a video as if the video is captured by a plurality of imaging devices on the display device 30, using the video captured by one imaging device 20. At that time, it is possible to automatically change over the regions in the video to be displayed on the display device 30 by using the feature amount in the detected regions.

Furthermore, changing over the regions in the video to be displayed on the display device 30 using the detected regions and the feature amount enables smooth changeover of display regions. Using the present technology makes it possible to reduce an equipment cost of the imaging device and the like at every video production site and to reduce an editing cost accompanying changeover of the video. It is noted that the processes by the information processing device 100 can be performed not only on the input video supplied in real time from the imaging device 20 but also on a video content after completion with imaging, and the processed video can be delivered as a video archive.

It is noted that the detected regions are not always set as depicted in FIG. 1. This is a setting strictly for realizing the display of the regions of interest to fit the motion of the person T. For example, in a case in which a writing board to which characters or the like are additionally drawn or erased among the three writing boards is to be always selected automatically and one writing board is to be changed over to another writing board, the detected regions may be set to fit magnitudes of the writing boards and may use a change in board content within the detected regions as a feature amount.

Figure 9:
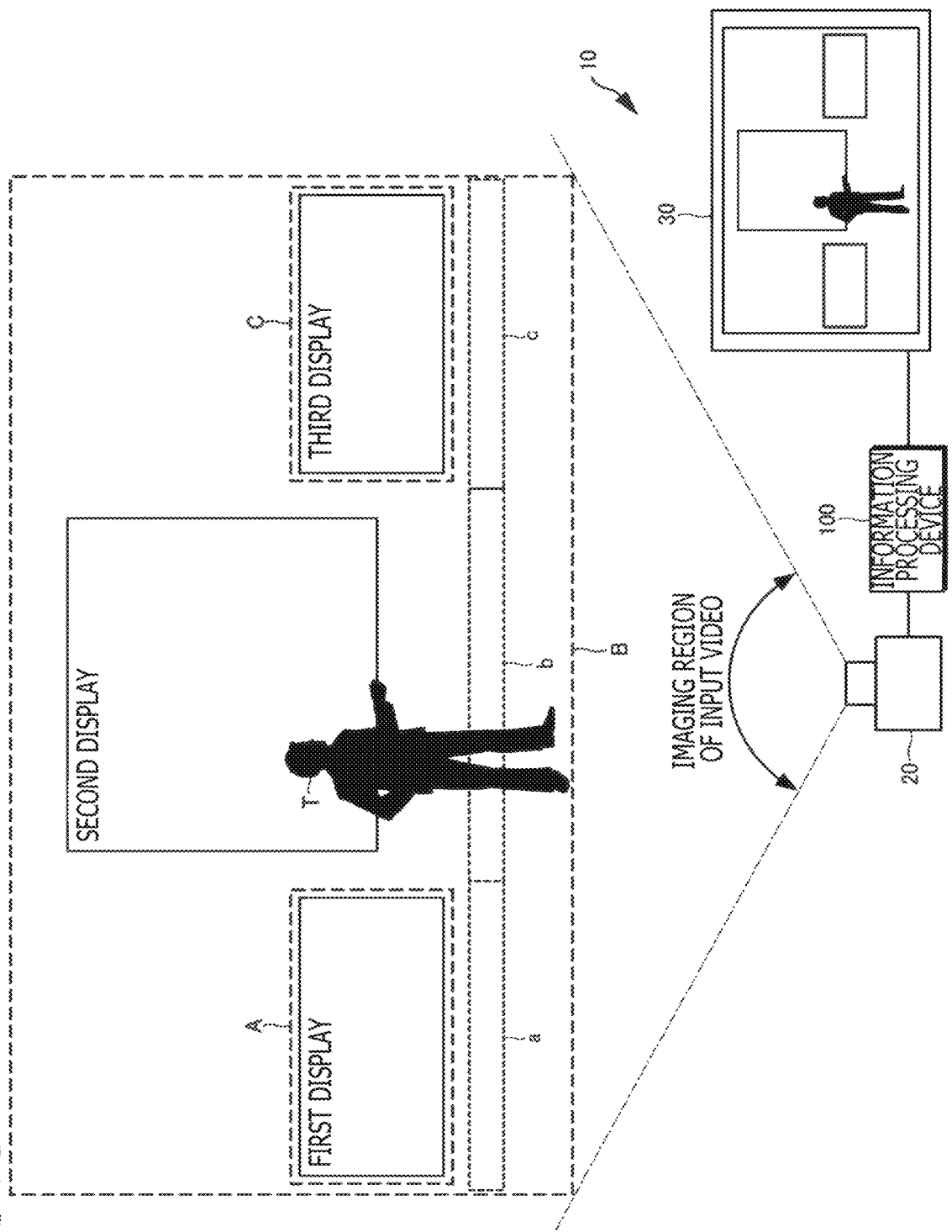
FIG. 9 is a diagram depicting another example of setting regions of interest and detected regions.

It is noted that each region of interest and the corresponding detected region are not necessarily required to be set to overlap each other. The region of interest and the corresponding detected region may be set in a separated state. Furthermore, as depicted in FIG. 1, it is not always necessary to set each region of interest to clip a specific region in the input video and the overall input video may be set as a region of interest. As depicted in, for example, FIG. 9, regions of interest A and C may be set with respect to an input video, a region of interest B having the same size as the angle of view of the input video may further be set, and detected regions a, b, and c may be set in such a manner that the detected regions a, b, and c do not overlap the regions of interest. In a case of setting the regions of interest and the detected regions in this way and in which the person T is present in front of a second display, then the feature amount is present only in the detected region b and a video in a range of the region of interest B, that is, the same video as the input video, can be displayed on the display device 30. An example like this is useful in capturing a media broadcasting video.

2. Second Embodiment

Figure 10:
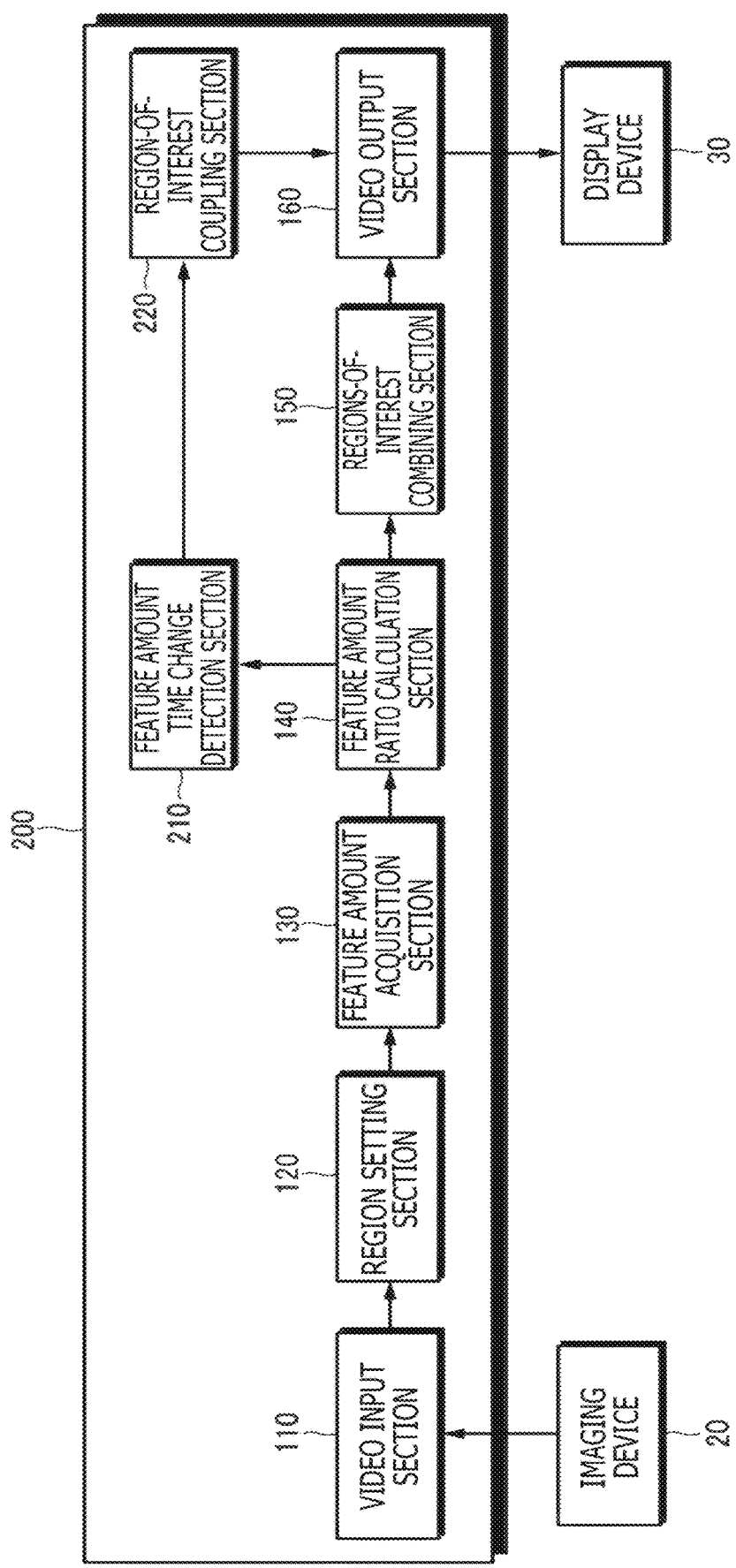
FIG. 10 is a block diagram depicting a configuration of an information processing device according to a second embodiment.

A second embodiment of the present technology will next be described. FIG. 10 is a block diagram depicting a configuration of an information processing device 200 according to the second embodiment. The second embodiment differs from the first embodiment in that the information processing device 200 includes a feature amount time change detection section 210 and a regions-of-interest coupling section 220. Configurations other than those sections are similar to those according to the first embodiment, and description thereof is omitted. Furthermore, the present embodiment will be described with reference to specific examples similar to those of FIG. 1.

Figure 11:
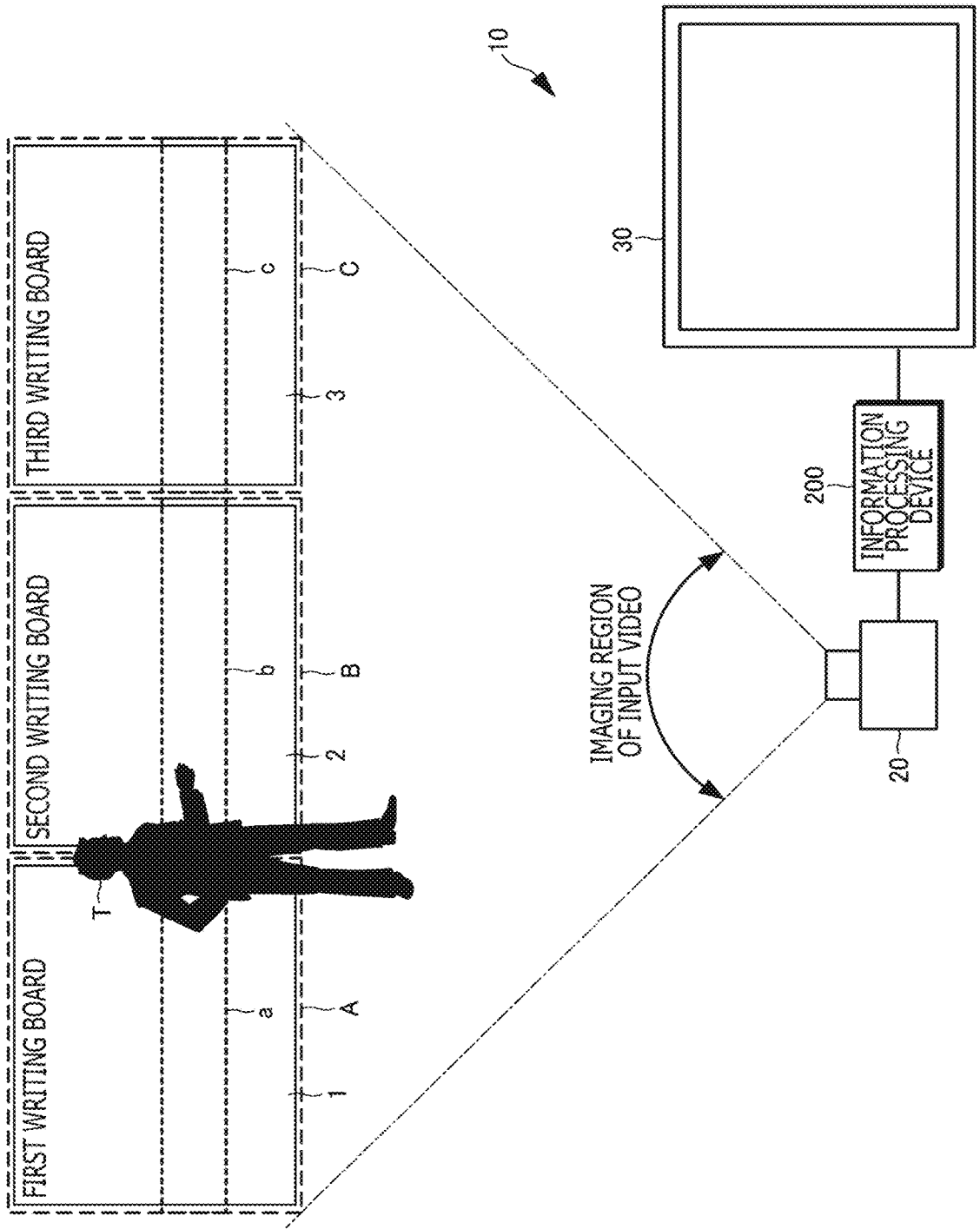
FIG. 11 is a diagram depicting a utilization state/state of use of a video display system according to the second embodiment.

As depicted in FIG. 11, a case in which the person T is standing between the first writing board 1 and the second writing board 2 and does not move from the spot, that is, a case in which a state of presence of the person T to stand in front of two detected regions continues and proportions of the feature amount do not change, will be considered.

The feature amount time change detection section 210 receives proportion information regarding the feature amount from the feature amount ratio calculation section 140 as needed, and detects that the proportions of the feature amount have not changed for a predetermined period of time or longer. This predetermined period of time can optionally be determined and set to the information processing device 100 by the user. In a case of detecting that the proportions of the feature amount have not been changed for the predetermined period of time or longer, the feature amount time change detection section 210 notifies the regions-of-interest coupling section 220 of a detection result. The input video data is also supplied to the regions-of-interest coupling section 220.

The regions-of-interest coupling section 220 couples together plural detected regions and creates a new region of interest (hereinafter, referred to as a "coupled region of interest") in a case in which the state in which the person T is present to stand in front of the plural detected regions continues and the proportions of the feature amount have not changed for the predetermined period of time or longer. A process by the regions-of-interest coupling section 220 is performed on the series of continuous frame images configuring the input video similarly to the combining process by the regions-of-interest combining section 150 according to the first embodiment. Here, the second embodiment will be described by taking a case in which the person T remains at a position at which the person T is standing in front of both the regions of interest A and B in an example similar to that of FIG. 1 as an example, as depicted in FIG. 11.

In a case in which the person T is standing in such a way as to overlap both the regions of interest A and B as depicted in FIG. 12A and the state continues, a state in which the overall regions of interest A and B are combined is displayed on the display device 30 in the first embodiment. In the second embodiment, by contrast, in the case in which the person T continues to be present in such a way as to overlap the regions of interest A and B, the regions-of-interest coupling section 220 creates a coupled region of interest R by coupling together the regions of interest A and B with a boundary between the regions of interest A and B assumed generally as a center as depicted in FIG. 12B, and transmits frame images obtained by clipping the coupled region of interest R from the input video to the display device 30. A video containing part of the region of interest A and part of the region of interest B is thereby displayed on the display device 30, and it is possible to display an easy-to-view video with the position at which the person T is standing assumed generally as the center, on the display device 30.

Figure 12:
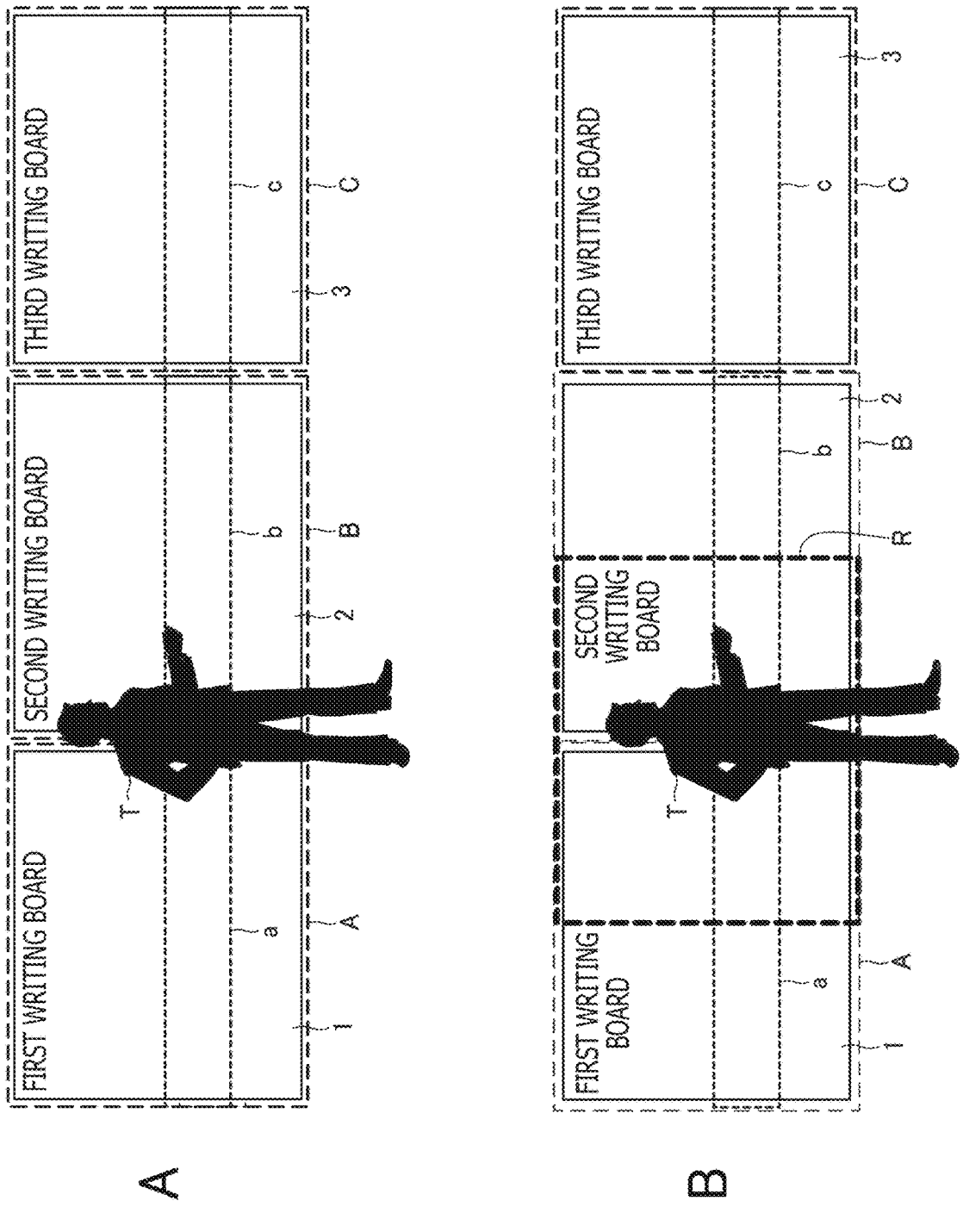
FIG. 12 depicts explanatory diagrams of coupling regions of interest.

Promptly changing over the display of a state on the display device 30 from a state in which the region of interest B is displayed to a state in which the coupled region of interest R depicted in FIG. 12B is displayed possibly causes a viewer to feel difficulty in viewing the video or to feel strange. It is, therefore, desirable to follow a transition process of setting the boundary between the regions of interest to the center step by step. In the example of FIG. 12, the person T is closer to the second writing board 2, that is, the region of interest B, and the detected region b is higher in the proportion of the feature amount than the detected region a, and thus, the display is made to make a transition from the region of interest B side to the region of interest A side step by step.

Figure 13:
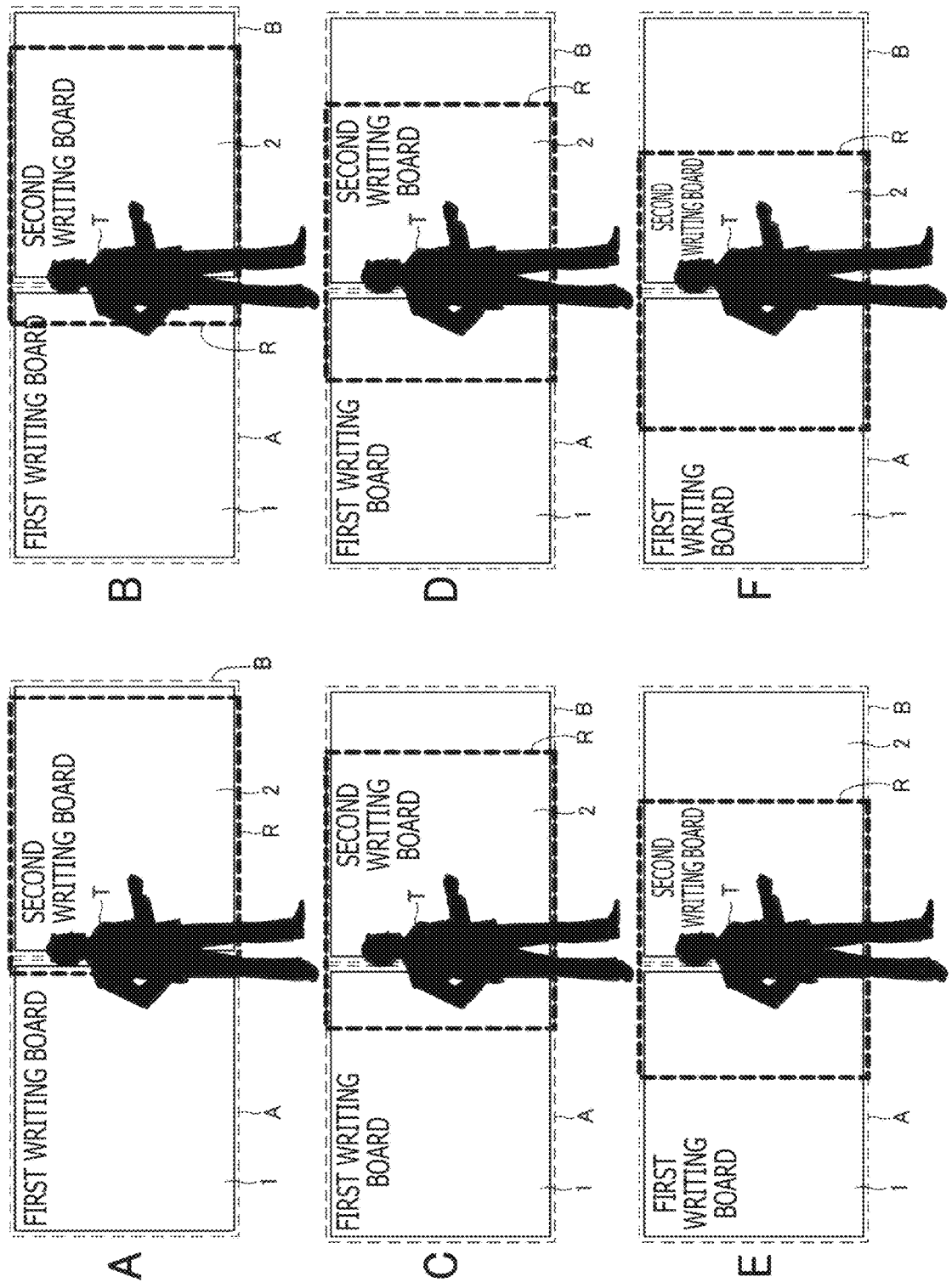
FIG. 13 depicts explanatory diagrams of coupling regions of interest.

Transition of the coupled region of interest R that is a range displayed on the display device 30 at that time is as depicted in FIG. 13. As depicted in FIGS. 13A to 13F, the coupled region of interest R gradually transitions from the region of interest B side corresponding to the detected region b higher in the proportion of the feature amount toward the region of interest A side. Furthermore, as depicted in FIG. 13F, the coupled region of interest R finally transitions to a state in which the boundary (coupling portion) between the regions of interest A and B is located at the center of the coupled region of interest R.

It is noted that, at this time, a speed of transition of the coupled region of interest R until the boundary between the regions of interest A and B is located generally at the center of the coupled region of interest R is determined depending on how much the coupled region of interest R moves per frame image. As a moving distance of the coupled region of interest R is larger per frame image, the transition speed becomes faster, and as the moving distance of the coupled region of interest R is smaller per frame image, the transition speed becomes slower. This transition speed can optionally be determined by the user.

According to this second embodiment, in the case in which the object that is an object the feature amount of which is to be detected is standing in front of two or more detected regions and the feature amount does not change, two or more regions of interest can be displayed, in an easy-to-view state, on the display device 30 in a state of containing the object.

It is noted that the feature amount time change detection section 210 may not only detect that the proportions of the feature amount have not changed for the predetermined period of time or longer but may also detect whether the change in the proportions of the feature amount is within a threshold having a predetermined upper limit and a predetermined lower limit. It is thereby possible to similarly perform processes to those described above even in a case in which the person T slightly moves but continues to be present to stand in front of plural detected regions.

It is noted that examples of a method of handling a case in which the feature amount has not been detected in any detected region for a fixed period of time or longer include a method of setting in advance a region of interest to which display is to transition at that time and displaying the region of interest on the display device 30, and a method of displaying the overall input video on the display device 30 as the region of interest.

The case in which the feature amount has not been detected in any detected region for the fixed period of time or longer means that an object has not been present in any detected region for the fixed period of time or longer. In such a case, a notification may be issued to the object (person) or the user of the video display system 10 to urge the object or the user to enter a detected region, by a voice message, display of a message, or the like.

3. Third Embodiment

Figure 14:
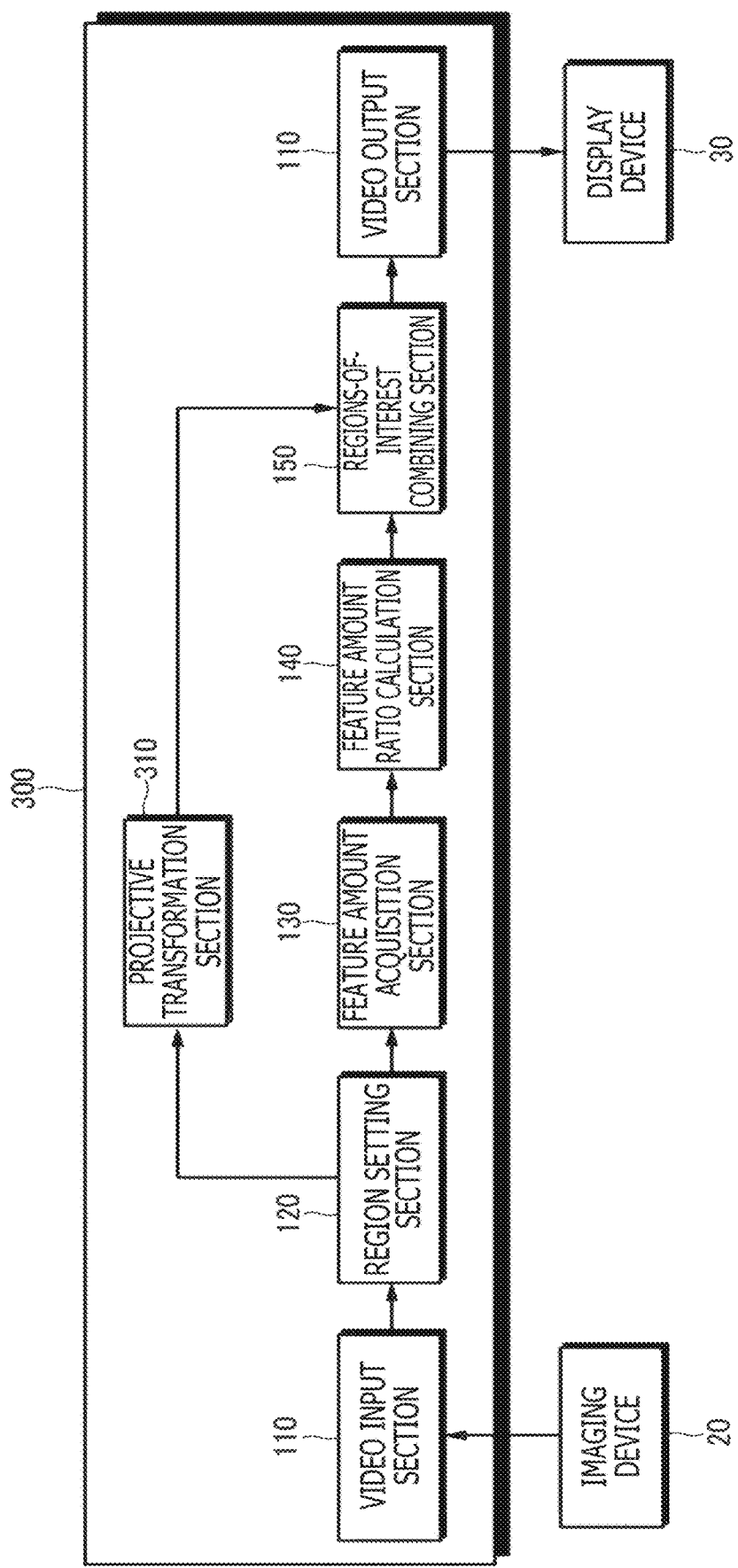
FIG. 14 is a block diagram depicting a configuration of an information processing device according to a third embodiment.

A third embodiment of the present technology will next be described. FIG. 14 is a block diagram depicting a configuration of an information processing device 300 according to the third embodiment. The third embodiment differs from the first embodiment in that the information processing device 300 includes a projective transformation section 310. Since configurations other than the protective transformation section 310 are similar to those according to the first embodiment, description thereof is omitted.

Figure 15:
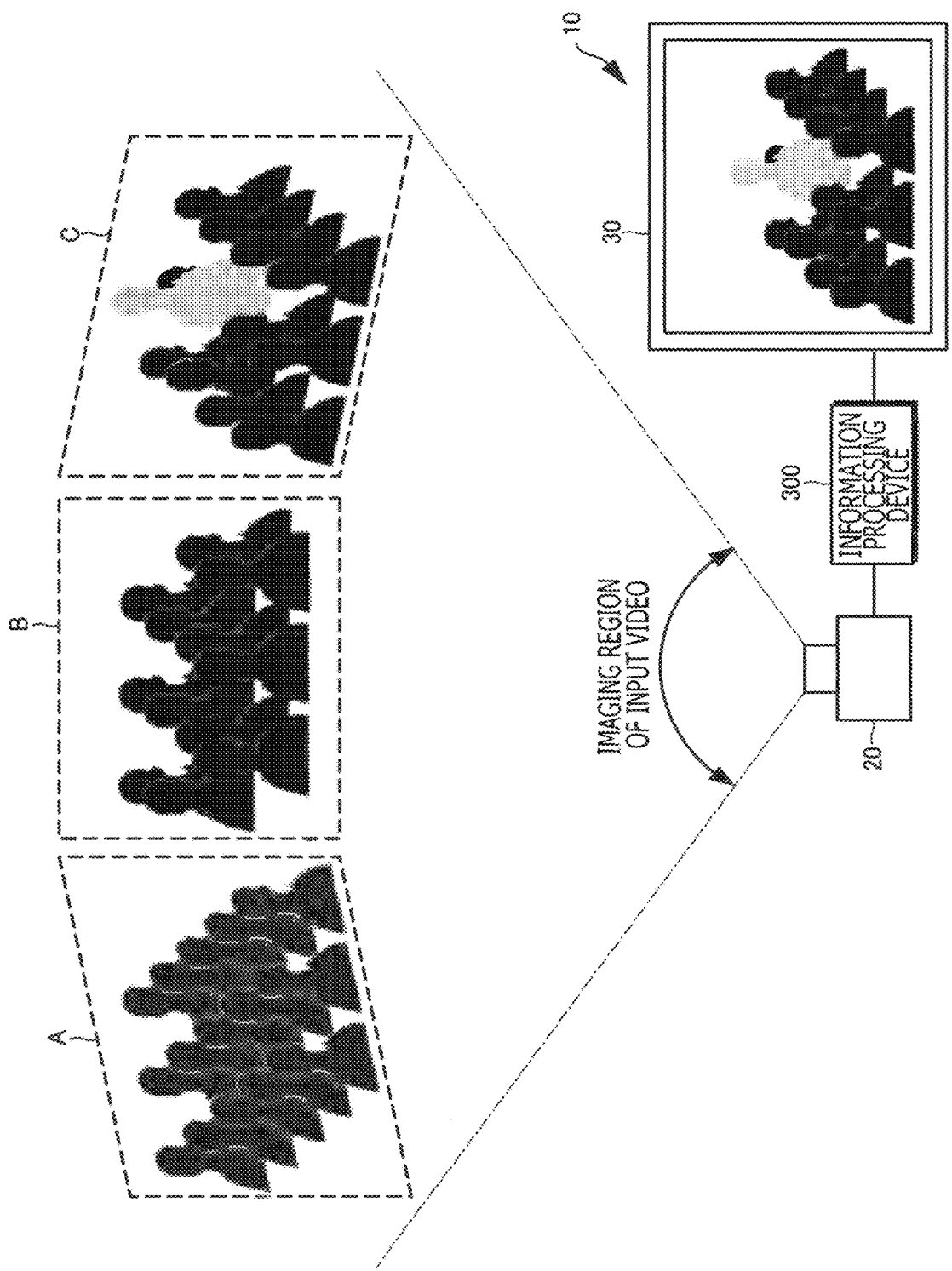
FIG. 15 is a diagram depicting a state of use of a video display system according to the third embodiment.
Figure 16:
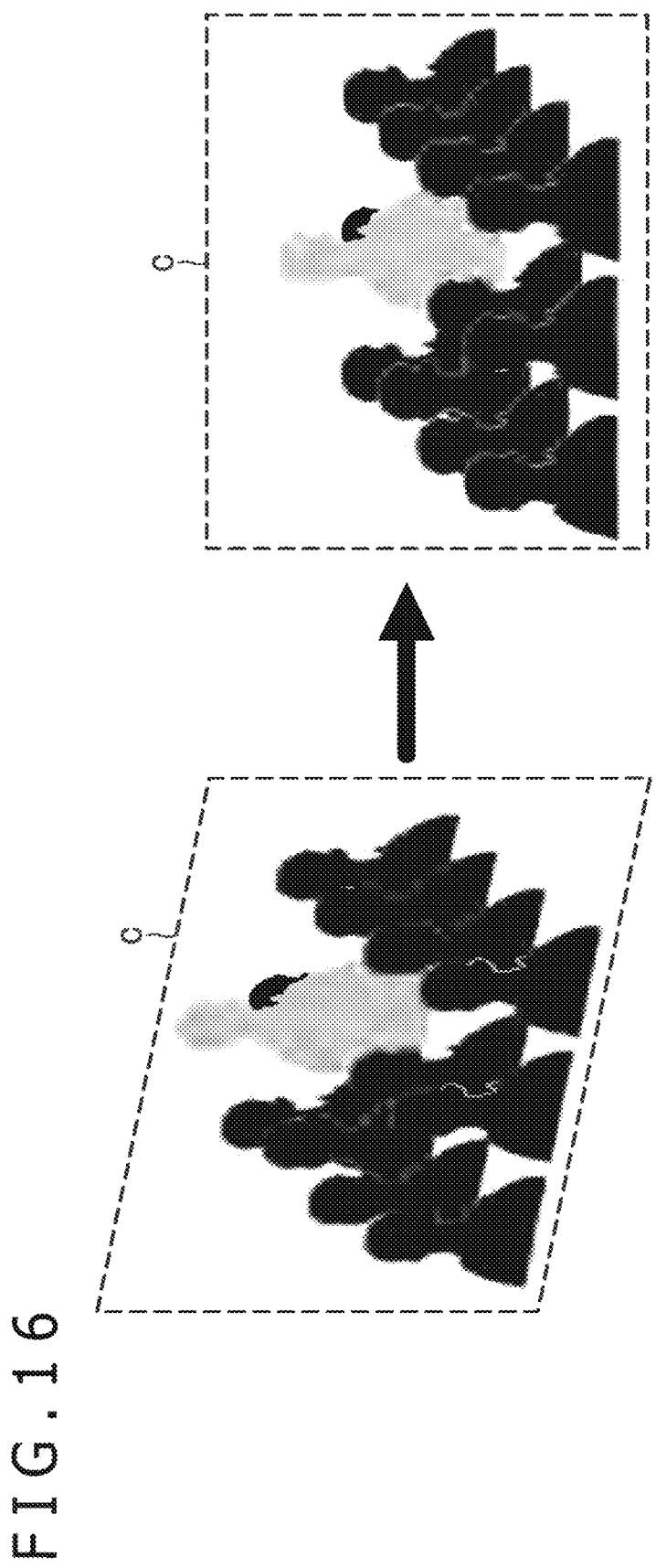
FIG. 16 is an explanatory diagram of projective transformation.

The projective transformation section 310 performs a projective transformation process on a region of interest that does not meet face-to-face a lens of the imaging device 20, in an incident direction. As depicted in, for example, FIG. 15, in a case of presence of a rectangular region of interest B and regions of interest A and C each set to have a generally parallelogram shape, and in which the regions-of-interest combining section 150 is to perform the combining process in this state, there is a concern that it is impossible to appropriately perform the combining process since the regions of interest do not match in shape. To address the concern, in the third embodiment, in a case of presence of a region of interest that does not meet face-to-face the imaging device 20 and that does not have a square or rectangular shape, the projective transformation section 310 performs a projective transformation process on the region of interest that does not meet face-to-face the imaging device 20. Performing the projective transformation process on the region of interest C depicted in FIG. 15, a rectangular region of interest C fit to the shape of the region of interest B can be obtained as depicted in FIG. 16. It is thereby possible to perform the combining process on the regions of interest similarly to the first embodiment. Although not depicted, it is desirable to perform the projective transformation process on the region of interest A in FIG. 15 as well.

Whether or not the projective transformation section 310 performs the projective transformation process on the region of interest can be determined depending on, for example, whether or not there is a region of interest having an angle that is not 90 degrees among four angles configuring the region of interest out of plural regions of interest set by the region setting section 120. Alternatively, the user may designate the region of interest to be subjected to the projective transformation process by a user's specific input of a state to the display device 30.

It is noted that the information processing device 300 is configured such that the frame images configuring the video to be processed are supplied from the region setting section 120 to the feature amount acquisition section 130 and the projective transformation section 310. Therefore, the feature amount acquisition section 130 and the feature amount ratio calculation section 140 perform processes as described in the first embodiment in parallel to the projective transformation process performed by the projective transformation section 310 on the region of interest. In addition, the combining process on the regions of interest based on a result of comparison by the feature amount ratio calculation section 140 is performed on the region of interest subjected to the projective transformation process.

It is noted that the projective transformation section 310 may further perform a process for expanding or shrinking a length or a width to conform to specifications of an output video and uniformly adjusting the regions of interest so that the regions-of-interest combining section 150 combines the plural regions of interest after the process by the projective transformation section 310.

According to this third embodiment, even in the case in which the regions of interest differ in shape, the shapes of the regions of interest are made to match by the projective transformation process, and thus, it is possible to perform the combining process on the regions of interest and display any of the regions of interest on the display device 30 in an appropriate state even in the case in which the regions of interest differ in shape.

It is noted that a state of the object within each detected region can be obtained either on the basis of a proportion of presence of pixels configuring the object (proportion of the feature amount) within the detected region, or on the basis of a situation of the movement of the object in the first to third embodiments described above. The proportion of presence of pixels configuring the object within the detected region is as already described with reference to FIGS. 4 to 7 and the like. The proportion of presence can be obtained by measuring the number of pixels configuring the object in each detected region and calculating the proportion of the pixels of the object in each detected region with respect to the total detected region that is a combination of all of the detected regions. Switchover and transition of the region of interest can be carried out on the basis of this proportion of presence of pixels (proportion of the feature amount.)

In a case of obtaining the state of the object on the basis of the situation of the movement of the object, a moving speed of the object is obtained using a well-known speed detection technology and changeover, combining, and transition of the regions of interest to be displayed are carried out according to the moving speed. By detecting the moving speed of the object, the position of the object in the detected region and the proportion of presence (proportion of the feature amount) of the object can be obtained from the moving speed of the object similarly to the way depicted in FIG. 7 and the changeover, the combining, and the transition of the regions of interest can be carried out on the basis of the position and the proportion of presence.

The moving speed of the object can be obtained, for example, from a difference in the position of the object between one frame image configuring the input video and a next frame image and a frame rate. Furthermore, a speed sensor that is a device provided in the imaging device or other than the imaging device may obtain the speed of the object. Examples of the speed sensor include a speed sensor that applies a laser beam, a microwave, an ultrasonic wave, or the like onto an object to be measured (object) and that measures a speed from a frequency change of a reflected wave.

Moreover, the region of interest may be displayed on the display device 30 by selecting the region of interest to be displayed from among the plural regions of interest set within the input video and changing over one region of interest to the selected region of interest according to the state of the object described above in the detected region, or by causing the region of interest to make a smooth transition to the other region of interest according to the state of the object. Furthermore, the region of interest may be displayed on the display device 30 by changing a position and a range of the region of interest to be clipped from the input video according to the state of the object.

4. Example of User Interface

An example of a user interface at a time of using the present technology will next be described. This user interface is displayed on a display section (not depicted) provided in the information processing device 100, the display device 30, or the like, and used by the user to input the regions of interest and the detected regions. A user interface for inputting the regions of interest and the detected regions depicted in FIG. 17 includes a region-of-interest input button 402 and a detected-region input button 403. Upon user's input by depressing of the region-of-interest input button 402, the user interface makes a transition to a region-of-interest input mode depicted in FIG. 17A. Furthermore, upon user's input by depressing of the detected-region input button 403, the user interface makes a transition to a detected-region input mode depicted in FIG. 17B.

In the region-of-interest input mode depicted in FIG. 17A, the user interface includes an imaging region display region 401, the region-of-interest input button 402, the detected-region input button 403, a region add button 404, and a region delete button 405.

After transition to the region-of-interest input mode, the user can designate four points by designating an area inside the imaging region display region 401 by a mouse cursor, a stylus pen, the user's finger, or the like and display a region-of-interest icon 410 indicating the region of interest. The region-of-interest icon 410 is configured from a rectangular frame and points provided in four corners of the frame. By clicking on and moving the point or points configuring the region-of-interest icon 410, it is possible to change a shape and a size of the region of interest, and by clicking on and moving an area inside the region-of-interest icon 410, it is possible to change a position of the region of interest.

Upon determination of the shape, the size, and the position of the region of interest, the user performs input by depressing the region add button 404. Region-of-interest information is thereby stored in the information processing device 100. In a case of deleting the region of interest that is determined once or that is in the process of adjusting the size and the position thereof, the user performs input by depressing the region delete button 405.

After transition to the detected-region input mode, the user can designate four points by designating an area inside the imaging region display region 401 by the mouse cursor or the like and display a detected region icon 420 indicating the detected region. The detected region icon 420 is configured from a rectangular frame and points provided in four corners of the frame. By clicking on and moving the point or points configuring the detected region icon 420, it is possible to change a shape and a size of the detected region, and by clicking on and moving an area inside the detected region icon 420, it is possible to change a position of the detected region.

Upon determination of the shape, the size, and the position of the region of interest, the user performs input by depressing the region add button 404. Detected region information is thereby stored in the information processing device 100. In a case of deleting the detected region that is determined once or that is in the process of adjusting the size and the position thereof, the user performs input by depressing the region delete button 405.

Furthermore, in the detected-region input mode, motion items 406 for selecting a motion of the information processing device 100 in a case in which the feature amount is not detected in any detected region are displayed. An overview item is to display an overall imaging region by the imaging device 20, that is, the overall video input to the information processing device 100. Preset items are each to actuate the information processing device 100 as optionally determined by the user or as preset in the information processing device 100.

Furthermore, in the detected-region input mode, a subject select button 407 for selecting the object the feature amount of which is to be detected is provided.

It is noted that the user interface depicted in FIG. 17 is merely an example and the user interface is not limited to that depicted in FIG. 17. Furthermore, the shapes of the regions of interest and the detected regions are not limited to the quadrangular shape and may be a triangular shape, a polygonal shape having five or more edges, or a circular shape.

5. Specific Examples of Mode of Use of Present Technology

[5-1. First Mode of Use]

Figure 18:
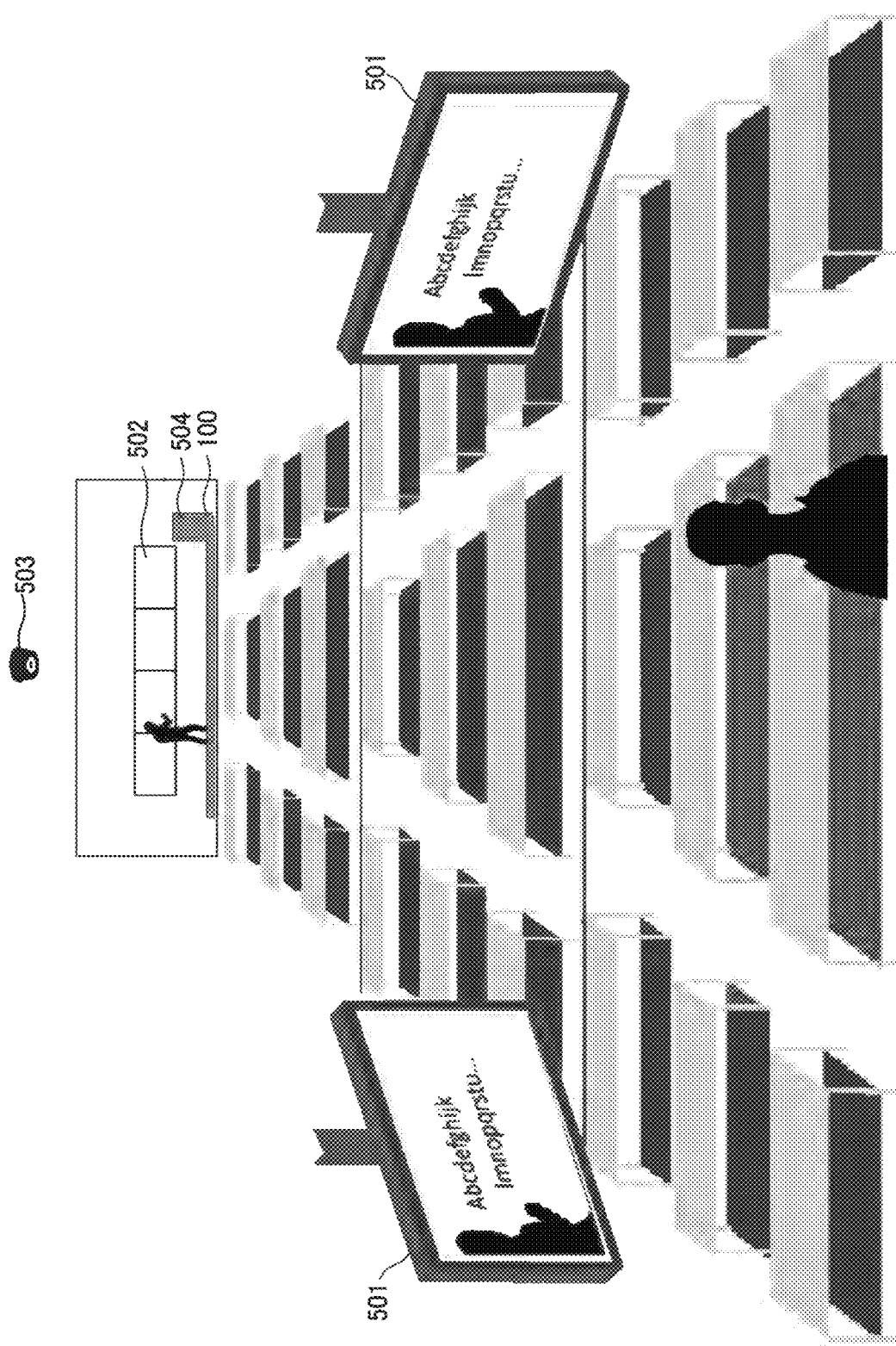
FIG. 18 is a diagram depicting a first mode of use of the information processing device.

Specific examples of modes of use of the present technology will next be described. The present technology is useful in a presentation or a lecture (hereinafter, referred to as a "presentation") in a wide classroom, a wide conference room, or the like as depicted in FIG. 18. For using the present technology, it is necessary for an imaging device 503 to image in whole a whiteboard 502 to be displayed on each external display device 501. The information processing device 100 is installed on a platform or the like and connected to the imaging device 503 and each external display device 501 in advance. A lecturer determines regions of interest and detected regions in advance before the presentation and inputs the determined regions of interest and detected regions to the information processing device 100.

At a time of starting the presentation, the processes by the information processing device 100 according to the present technology are started by turning on a system startup switch 504 present on the platform or the like. The information processing device 100 performs the processes on an input video of the presentation captured by the imaging device 503, and the processed video is displayed on each external display device 501 in real time. The video displayed on each external display device 501 functions as an auxiliary video and it is easier for a participant located at a position remote from the lecturer in a large venue as depicted in FIG. 18 to view the presentation. Moreover, the present technology can also be used to deliver a real time video to a remote location. Furthermore, the video created by the information processing device 100 can be recorded and the video can be delivered as a video archive after the presentation ends. At a time of end of the presentation, the processes and recording are ended by turning off the system startup switch.

[5-2. Second Mode of Use]

The first embodiment has been described by using the example in which one person T as the object the feature amount of which is to be detected is standing in front of the writing board or writing boards. However, the present technology is also applicable to cases other than such an example. As depicted in, for example, FIG. 19, the present technology is also applicable to a case of imaging a plurality of listeners in a presentation or a lecture.

Figure 19:
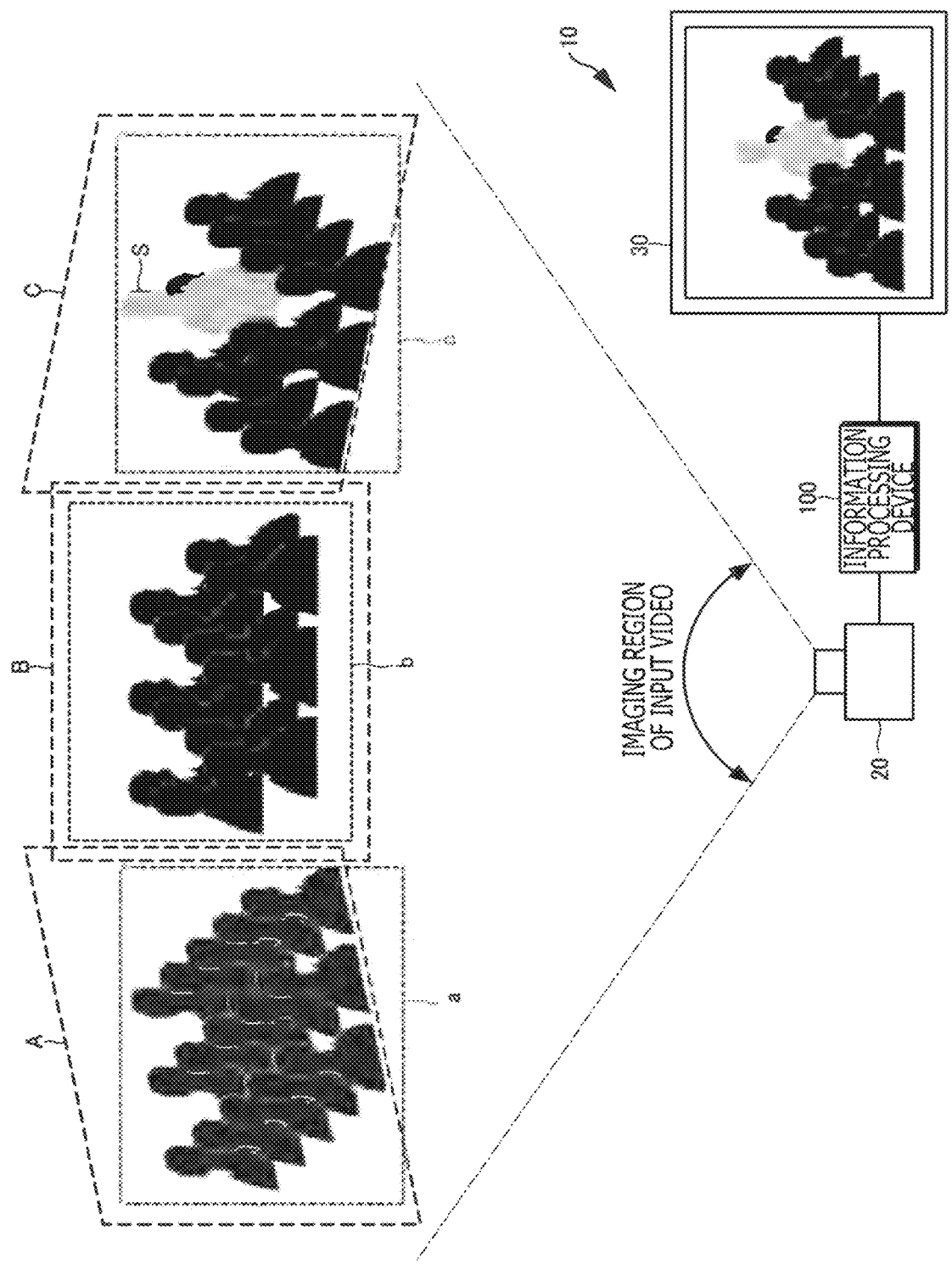
FIG. 19 is a diagram depicting a second mode of use of the information processing device.

In an example of FIG. 19, the imaging device 20 images all listeners, and ranges each surrounding a plurality of listeners are set as the regions of interest A, B, and C on the basis of the positions where the listeners are sitting or the like. Moreover, the detected regions a, b, and c to contain all the listeners in the regions of interest are set to correspond to the regions of interest, respectively. Furthermore, processes similar to those in the first to third embodiments are performed with a degree of rising of the listeners assumed as a feature amount. This degree of rising of listeners is an example of a "degree of a change" in the claims. It is noted that the degree of rising of listeners can be obtained either by a well-known posture detection technology or by a change or the like in a face position detected by a well-known face detection technology.

FIG. 20 depicts transition of the video displayed on the display device 30. In a case in which every listener is sitting, the feature amount is not detected and the input video is, therefore, displayed on the display device 30 as depicted in FIG. 20A. When a listener S in the region of interest C rises up, then a degree of rising of the listener S is detected as a feature amount, and a total region and the region of interest C are combined according to the feature amount, and combined frame images are created. The combined frame images are then transmitted to the display device 30 and the series of combined frame images are displayed as a video.

The case in which the feature amount is not detected in any detected region is an initial state depicted in FIG. 20A, and an input video same as the input video is displayed in the initial state. When the listener S in the region of interest C rises up, then the input video and the region of interest C are combined as depicted in FIGS. 20B to 20D according to a change in the feature amount with the degree of rising of the listener S assumed as the feature amount, and eventually, only the region of interest C is displayed on the display device 30 as depicted in FIG. 20E. Subsequently, in a case, for example, in which a listener present in the region of interest A rises up, the display on the display device 30 is changed over from the display of the region of interest C to the display of the region of interest A.

This mode of use makes it possible to clip the region of interest where a listener is present when the listener, for example, make a statement in a question period or the like in the presentation and to display the clipped region of interest on the display device 30. It is thereby possible to automatically display the listener who makes a statement, on the display device 30, even in a state in which it is unclear who makes a statement among the listeners.

6. Modifications

While the embodiments of the present technology have been specifically described, the present technology is not limited to the embodiments and various modifications based on a technical concept of the present technology can be made.

The object the feature amount of which is to be detected may be detected from within the input video by a well-known subject detection technology or may be designated by the user in advance. Examples of a method of designating an object by a user in advance include a method of displaying subjects recognized by a well-known subject recognition technology on the display device 30 or the like to present the subjects to the user and inputting data by the user selecting an object from among the subjects and determining the object. Moreover, examples of the method also include a method of designating a region in the input video by a user using a frame icon or the like and determining a subject present in the frame icon as the object the feature amount of which is to be detected. Furthermore, the object is not limited to a person and may be any of moving objects such as an animal, a vehicle, and a robot.

Figure 21:
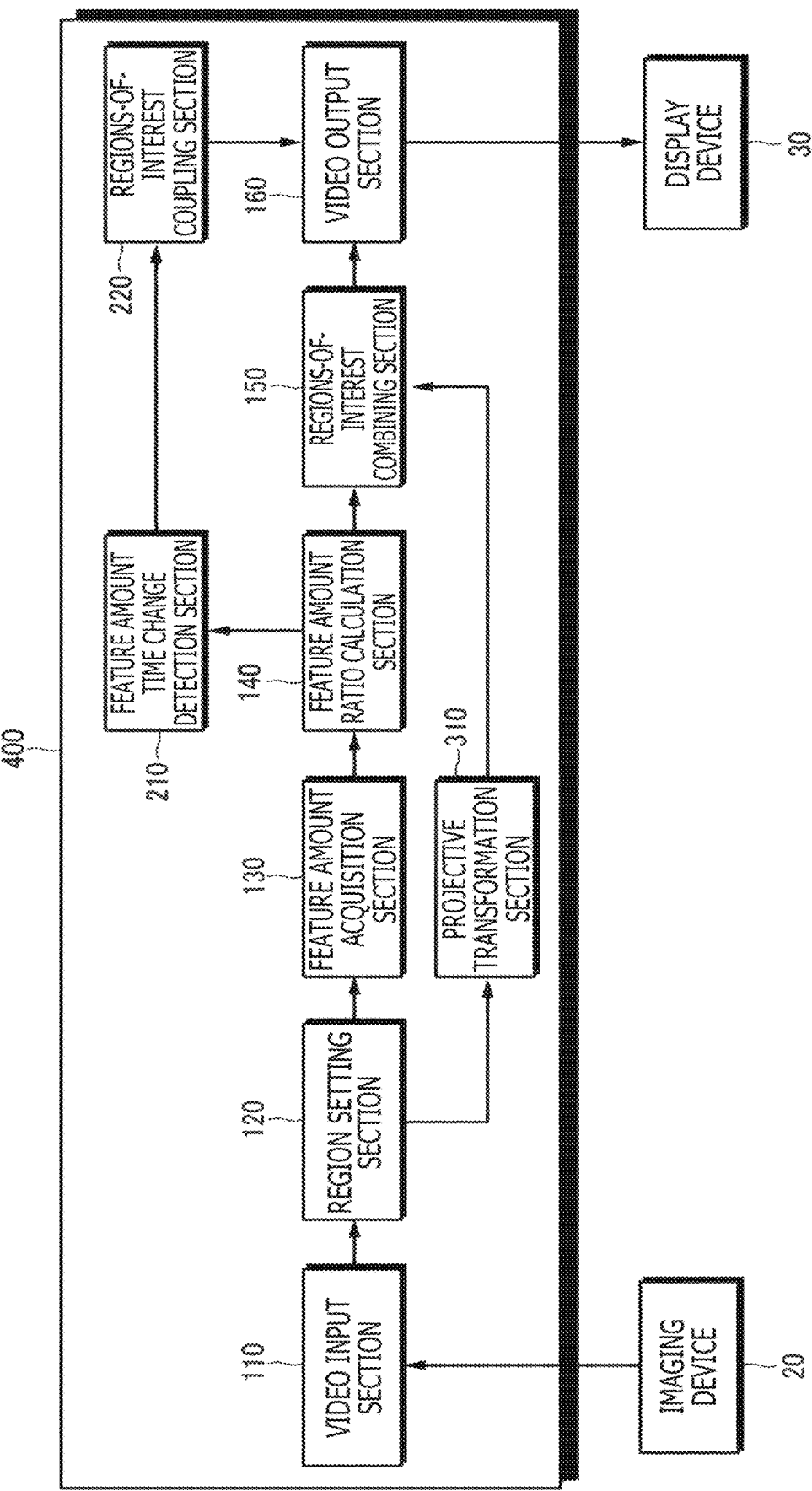
FIG. 21 is a block diagram depicting an example of a configuration of an information processing device according to a modification.

As depicted in FIG. 21, the information processing device may be configured as an information processing device 400 including the feature amount time change detection section 210, the regions-of-interest coupling section 220, and the projective transformation section 310 by combination of the first, second, and third embodiments.

Moreover, while any of the plural regions of interest set in the input video is displayed on the display device 30 according to the present technology, a viewer sometimes desires to grasp which region of interest is currently displayed. As depicted in FIG. 22, therefore, an icon 600 indicating which region of interest among the plural regions of interest is currently displayed may be displayed as an auxiliary function.

The icon 600 is configured with equally split rectangular quadrangles in a state in which a position relationship among the regions of interest is maintained so that the set number of regions of interest and a set arrangement of the regions of interest can be indicated. An example of FIG. 22 represents that the icon is configured with three quadrangles and that three regions of interest are arranged side by side. As depicted in FIG. 22A, in a case in which the central region of interest out of the three regions of interest is displayed on the display device 30, the central rectangle in the icon 600 may be displayed by being colored. The viewer can thereby grasp which region of interest is currently displayed on the display device 30. Moreover, as depicted in FIG. 22B, the icon 600 may be made to correspond to the detected regions, and the proportion of the feature amount detected in each detected region may be reflected in a change in a mode of display (such as a shade of color) of the icon 600. The viewer can thereby grasp where the subject the feature amount of which is to be detected is currently present. Furthermore, both an icon indicating the regions of interest and an icon indicating the detected regions may be displayed on the display device 30. It is noted that a shape of the icon 600 is not limited to a quadrangular shape and may be any shape such as a circular shape or a rectangular shape, and the currently displayed region of interest may be indicated to the user by characters.

Figure 23:
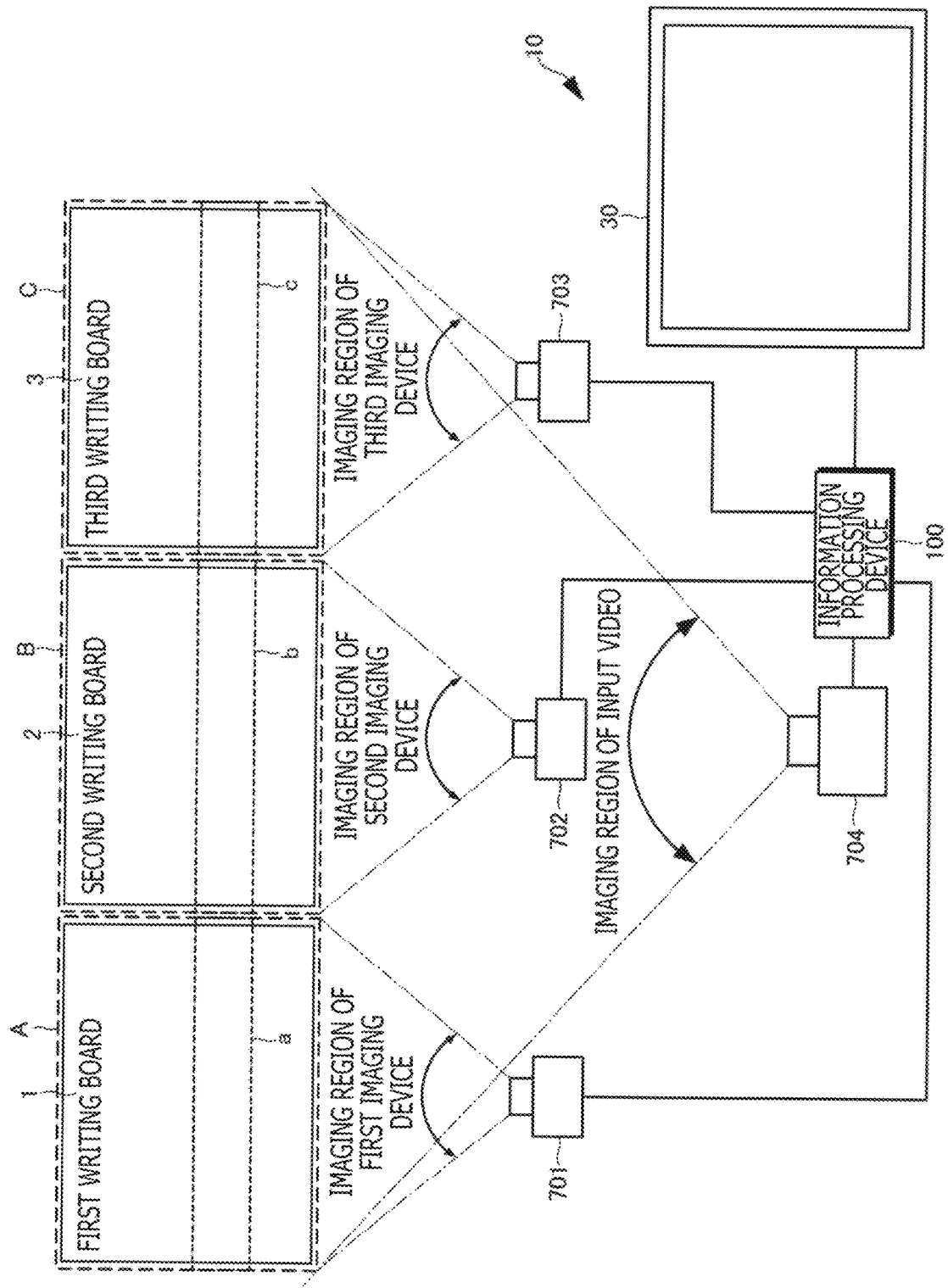
FIG. 23 is a block diagram depicting a configuration of a video display system according to the modification.

While the first to third embodiments have been described by taking the case in which the number of imaging devices is one as an example, the number of imaging devices is not limited to one. The video display system 10 may be configured using a plurality of imaging devices. As depicted in, for example, FIG. 23, a first imaging device 701 images the region of interest A, a second imaging device 702 images the region of interest B, a third imaging device 703 images the region of interest C, and a fourth imaging device 704 images an input video containing all of the regions of interest and supplies video data regarding all of the imaging devices to the information processing device 100. The information processing device 100 detects a feature amount in the detected regions from the input video captured by the fourth imaging device 704, and displays any of the regions of interest on the display device 30 on the basis of the feature amount.

It is noted that the present technology is also applicable to cases other than the case of processing the video in real time. For example, the processes in the present technology may be performed at a time of displaying a recorded video content on a display device. Moreover, the processes in the present technology may be performed on a video in real time, information associated with the regions of interest, the detected regions, the feature amount, changeover of the regions of interest, and the like may be recorded as metadata regarding the recorded video content, and the position and the range of each region of interest, a region-of-interest changeover speed, and the like may later be edited using the metadata. At that time, real-time processes on the video may be performed in response to a user input, or may be performed automatically by the information processing device 100 using the subject recognition technology, templates, or the like. Furthermore, a person viewing the video may designate any region which the person intends to view from the input video containing all subjects to be displayed on the display device as a region of interest so that the person can view the region of interest. This can be achieved since the input video in the present technology is a video containing all subjects to be displayed, differently from a scheme of panning and tilting the imaging device.

7. Application Examples

The technology according to the present disclosure can be applied to various products. For example, the technology according to the present disclosure may be implemented as a device mounted in a mobile body of any of kinds such as a vehicle, an electric-powered vehicle, a hybrid electric-powered vehicle, a two-wheeled vehicle, a bicycle, a personal mobility, an airplane, a drone, a ship, a robot, a construction machine, and an agricultural machine (tractor).

Figure 24:
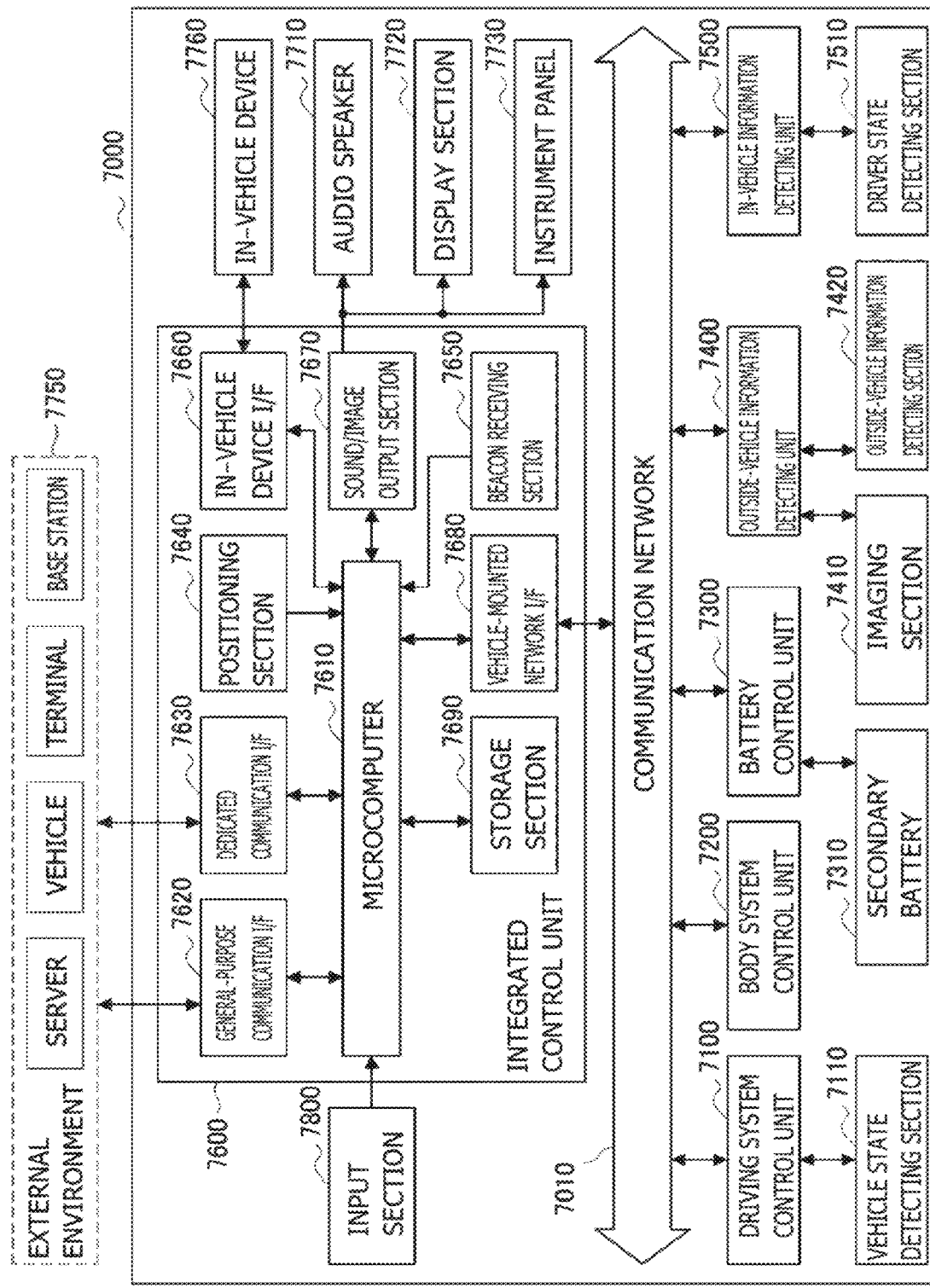
FIG. 24 is a block diagram depicting an example of schematic configuration of a vehicle control system.

FIG. 24 is a block diagram depicting an example of schematic configuration of a vehicle control system 7000 as an example of a mobile body control system to which the technology according to an embodiment of the present disclosure can be applied. The vehicle control system 7000 includes a plurality of electronic control units connected to each other via a communication network 7010. In the example depicted in FIG. 24, the vehicle control system 7000 includes a driving system control unit 7100, a body system control unit 7200, a battery control unit 7300, an outside-vehicle information detecting unit 7400, an in-vehicle information detecting unit 7500, and an integrated control unit 7600. The communication network 7010 connecting the plurality of control units to each other may, for example, be a vehicle-mounted communication network compliant with an arbitrary standard such as controller area network (CAN), local interconnect network (LIN), local area network (LAN), FlexRay (registered trademark), or the like.

Each of the control units includes: a microcomputer that performs arithmetic processing according to various kinds of programs; a storage section that stores the programs executed by the microcomputer, parameters used for various kinds of operations, or the like; and a driving circuit that drives various kinds of control target devices. Each of the control units further includes: a network interface (I/F) for performing communication with other control units via the communication network 7010; and a communication I/F for performing communication with a device, a sensor, or the like within and without the vehicle by wire communication or radio communication. A functional configuration of the integrated control unit 7600 illustrated in FIG. 24 includes a microcomputer 7610, a general-purpose communication I/F 7620, a dedicated communication I/F 7630, a positioning section 7640, a beacon receiving section 7650, an in-vehicle device I/F 7660, a sound/image output section 7670, a vehicle-mounted network I/F 7680, and a storage section 7690. The other control units similarly include a microcomputer, a communication I/F, a storage section, and the like.

The driving system control unit 7100 controls the operation of devices related to the driving system of the vehicle in accordance with various kinds of programs. For example, the driving system control unit 7100 functions as a control device for a driving force generating device for generating the driving force of the vehicle, such as an internal combustion engine, a driving motor, or the like, a driving force transmitting mechanism for transmitting the driving force to wheels, a steering mechanism for adjusting the steering angle of the vehicle, a braking device for generating the braking force of the vehicle, and the like. The driving system control unit 7100 may have a function as a control device of an antilock brake system (ABS), electronic stability control (ESC), or the like.

The driving system control unit 7100 is connected with a vehicle state detecting section 7110. The vehicle state detecting section 7110, for example, includes at least one of a gyro sensor that detects the angular velocity of axial rotational movement of a vehicle body, an acceleration sensor that detects the acceleration of the vehicle, and sensors for detecting an amount of operation of an accelerator pedal, an amount of operation of a brake pedal, the steering angle of a steering wheel, an engine speed or the rotational speed of wheels, and the like. The driving system control unit 7100 performs arithmetic processing using a signal input from the vehicle state detecting section 7110, and controls the internal combustion engine, the driving motor, an electric power steering device, the brake device, and the like.

The body system control unit 7200 controls the operation of various kinds of devices provided to the vehicle body in accordance with various kinds of programs. For example, the body system control unit 7200 functions as a control device for a keyless entry system, a smart key system, a power window device, or various kinds of lamps such as a headlamp, a backup lamp, a brake lamp, a turn signal, a fog lamp, or the like. In this case, radio waves transmitted from a mobile device as an alternative to a key or signals of various kinds of switches can be input to the body system control unit 7200. The body system control unit 7200 receives these input radio waves or signals, and controls a door lock device, the power window device, the lamps, or the like of the vehicle.

The battery control unit 7300 controls a secondary battery 7310, which is a power supply source for the driving motor, in accordance with various kinds of programs. For example, the battery control unit 7300 is supplied with information about a battery temperature, a battery output voltage, an amount of charge remaining in the battery, or the like from a battery device including the secondary battery 7310. The battery control unit 7300 performs arithmetic processing using these signals, and performs control for regulating the temperature of the secondary battery 7310 or controls a cooling device provided to the battery device or the like.

The outside-vehicle information detecting unit 7400 detects information about the outside of the vehicle including the vehicle control system 7000. For example, the outside-vehicle information detecting unit 7400 is connected with at least one of an imaging section 7410 and an outside-vehicle information detecting section 7420. The imaging section 7410 includes at least one of a time-of-flight (ToF) camera, a stereo camera, a monocular camera, an infrared camera, and other cameras. The outside-vehicle information detecting section 7420, for example, includes at least one of an environmental sensor for detecting current atmospheric conditions or weather conditions and a peripheral information detecting sensor for detecting another vehicle, an obstacle, a pedestrian, or the like on the periphery of the vehicle including the vehicle control system 7000.

The environmental sensor, for example, may be at least one of a rain drop sensor detecting rain, a fog sensor detecting a fog, a sunshine sensor detecting a degree of sunshine, and a snow sensor detecting a snowfall. The peripheral information detecting sensor may be at least one of an ultrasonic sensor, a radar device, and a LIDAR device (Light detection and Ranging device, or Laser imaging detection and ranging device). Each of the imaging section 7410 and the outside-vehicle information detecting section 7420 may be provided as an independent sensor or device, or may be provided as a device in which a plurality of sensors or devices are integrated.

Figure 25:
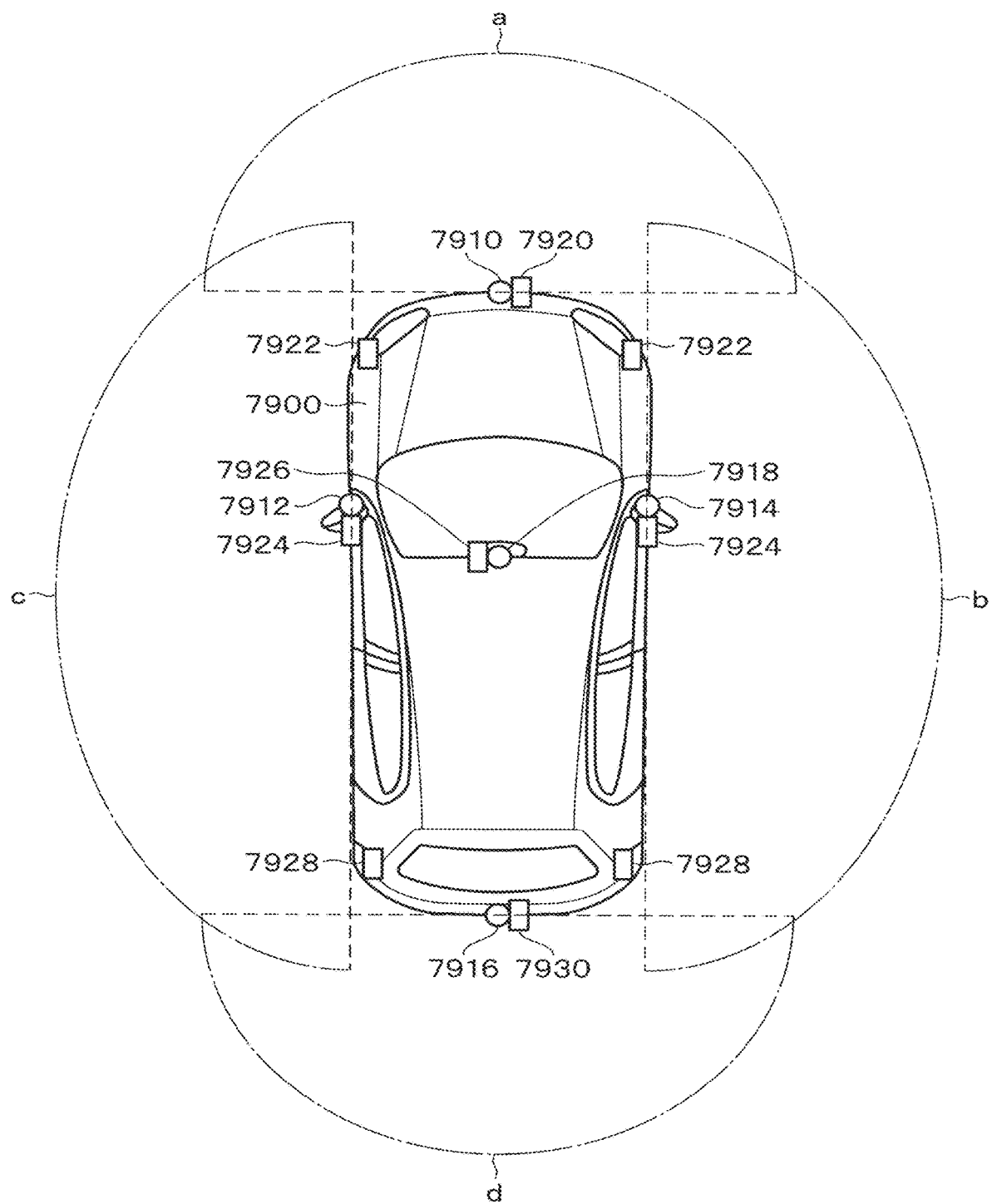
FIG. 25 is a diagram of assistance in explaining an example of installation positions of an outside-vehicle information detecting section and an imaging section.

FIG. 25 depicts an example of installation positions of the imaging section 7410 and the outside-vehicle information detecting section 7420. Imaging sections 7910, 7912, 7914, 7916, and 7918 are, for example, disposed at at least one of positions on a front nose, sideview mirrors, a rear bumper, and a back door of the vehicle 7900 and a position on an upper portion of a windshield within the interior of the vehicle. The imaging section 7910 provided to the front nose and the imaging section 7918 provided to the upper portion of the windshield within the interior of the vehicle obtain mainly an image of the front of the vehicle 7900. The imaging sections 7912 and 7914 provided to the sideview mirrors obtain mainly an image of the sides of the vehicle 7900. The imaging section 7916 provided to the rear bumper or the back door obtains mainly an image of the rear of the vehicle 7900. The imaging section 7918 provided to the upper portion of the windshield within the interior of the vehicle is used mainly to detect a preceding vehicle, a pedestrian, an obstacle, a signal, a traffic sign, a lane, or the like.

Incidentally, FIG. 25 depicts an example of photographing ranges of the respective imaging sections 7910, 7912, 7914, and 7916. An imaging range a represents the imaging range of the imaging section 7910 provided to the front nose. Imaging ranges b and c respectively represent the imaging ranges of the imaging sections 7912 and 7914 provided to the sideview mirrors. An imaging range d represents the imaging range of the imaging section 7916 provided to the rear bumper or the back door. A bird's-eye image of the vehicle 7900 as viewed from above can be obtained by superimposing image data imaged by the imaging sections 7910, 7912, 7914, and 7916, for example.

Outside-vehicle information detecting sections 7920, 7922, 7924, 7926, 7928, and 7930 provided to the front, rear, sides, and corners of the vehicle 7900 and the upper portion of the windshield within the interior of the vehicle may be, for example, an ultrasonic sensor or a radar device. The outside-vehicle information detecting sections 7920, 7926, and 7930 provided to the front nose of the vehicle 7900, the rear bumper, the back door of the vehicle 7900, and the upper portion of the windshield within the interior of the vehicle may be a LIDAR device, for example. These outside-vehicle information detecting sections 7920 to 7930 are used mainly to detect a preceding vehicle, a pedestrian, an obstacle, or the like.

Returning to FIG. 24, the description will be continued. The outside-vehicle information detecting unit 7400 makes the imaging section 7410 image an image of the outside of the vehicle, and receives imaged image data. In addition, the outside-vehicle information detecting unit 7400 receives detection information from the outside-vehicle information detecting section 7420 connected to the outside-vehicle information detecting unit 7400. In a case where the outside-vehicle information detecting section 7420 is an ultrasonic sensor, a radar device, or a LIDAR device, the outside-vehicle information detecting unit 7400 transmits an ultrasonic wave, an electromagnetic wave, or the like, and receives information of a received reflected wave. On the basis of the received information, the outside-vehicle information detecting unit 7400 may perform processing of detecting an object such as a human, a vehicle, an obstacle, a sign, a character on a road surface, or the like, or processing of detecting a distance thereto. The outside-vehicle information detecting unit 7400 may perform environment recognition processing of recognizing a rainfall, a fog, road surface conditions, or the like on the basis of the received information. The outside-vehicle information detecting unit 7400 may calculate a distance to an object outside the vehicle on the basis of the received information.

In addition, on the basis of the received image data, the outside-vehicle information detecting unit 7400 may perform image recognition processing of recognizing a human, a vehicle, an obstacle, a sign, a character on a road surface, or the like, or processing of detecting a distance thereto. The outside-vehicle information detecting unit 7400 may subject the received image data to processing such as distortion correction, alignment, or the like, and combine the image data imaged by a plurality of different imaging sections 7410 to generate a bird's-eye image or a panoramic image. The outside-vehicle information detecting unit 7400 may perform viewpoint conversion processing using the image data imaged by the imaging section 7410 including the different imaging parts.

The in-vehicle information detecting unit 7500 detects information about the inside of the vehicle. The in-vehicle information detecting unit 7500 is, for example, connected with a driver state detecting section 7510 that detects the state of a driver. The driver state detecting section 7510 may include a camera that images the driver, a biosensor that detects biological information of the driver, a microphone that collects sound within the interior of the vehicle, or the like. The biosensor is, for example, disposed in a seat surface, the steering wheel, or the like, and detects biological information of an occupant sitting in a seat or the driver holding the steering wheel. On the basis of detection information input from the driver state detecting section 7510, the in-vehicle information detecting unit 7500 may calculate a degree of fatigue of the driver or a degree of concentration of the driver, or may determine whether the driver is dozing. The in-vehicle information detecting unit 7500 may subject an audio signal obtained by the collection of the sound to processing such as noise canceling processing or the like.

The integrated control unit 7600 controls general operation within the vehicle control system 7000 in accordance with various kinds of programs. The integrated control unit 7600 is connected with an input section 7800. The input section 7800 is implemented by a device capable of input operation by an occupant, such, for example, as a touch panel, a button, a microphone, a switch, a lever, or the like. The integrated control unit 7600 may be supplied with data obtained by voice recognition of voice input through the microphone. The input section 7800 may, for example, be a remote control device using infrared rays or other radio waves, or an external connecting device such as a mobile telephone, a personal digital assistant (PDA), or the like that supports operation of the vehicle control system 7000. The input section 7800 may be, for example, a camera. In that case, an occupant can input information by gesture. Alternatively, data may be input which is obtained by detecting the movement of a wearable device that an occupant wears. Further, the input section 7800 may, for example, include an input control circuit or the like that generates an input signal on the basis of information input by an occupant or the like using the above-described input section 7800, and which outputs the generated input signal to the integrated control unit 7600. An occupant or the like inputs various kinds of data or gives an instruction for processing operation to the vehicle control system 7000 by operating the input section 7800.

The storage section 7690 may include a read only memory (ROM) that stores various kinds of programs executed by the microcomputer and a random access memory (RAM) that stores various kinds of parameters, operation results, sensor values, or the like. In addition, the storage section 7690 may be implemented by a magnetic storage device such as a hard disc drive (HDD) or the like, a semiconductor storage device, an optical storage device, a magneto-optical storage device, or the like.

The general-purpose communication I/F 7620 is a communication I/F used widely, which communication I/F mediates communication with various apparatuses present in an external environment 7750. The general-purpose communication I/F 7620 may implement a cellular communication protocol such as global system for mobile communications (GSM (registered trademark)), worldwide interoperability for microwave access (WiMAX (registered trademark)), long term evolution (LTE (registered trademark)), LTE-advanced (LTE-A), or the like, or another wireless communication protocol such as wireless LAN (referred to also as wireless fidelity (Wi-Fi (registered trademark)), Bluetooth (registered trademark), or the like. The general-purpose communication I/F 7620 may, for example, connect to an apparatus (for example, an application server or a control server) present on an external network (for example, the Internet, a cloud network, or a company-specific network) via a base station or an access point. In addition, the general-purpose communication I/F 7620 may connect to a terminal present in the vicinity of the vehicle (which terminal is, for example, a terminal of the driver, a pedestrian, or a store, or a machine type communication (MTC) terminal) using a peer to peer (P2P) technology, for example.

The dedicated communication I/F 7630 is a communication I/F that supports a communication protocol developed for use in vehicles. The dedicated communication I/F 7630 may implement a standard protocol such, for example, as wireless access in vehicle environment (WAVE), which is a combination of institute of electrical and electronic engineers (IEEE) 802.11p as a lower layer and IEEE 1609 as a higher layer, dedicated short range communications (DSRC), or a cellular communication protocol. The dedicated communication I/F 7630 typically carries out V2X communication as a concept including one or more of communication between a vehicle and a vehicle (Vehicle to Vehicle), communication between a road and a vehicle (Vehicle to Infrastructure), communication between a vehicle and a home (Vehicle to Home), and communication between a pedestrian and a vehicle (Vehicle to Pedestrian).

The positioning section 7640, for example, performs positioning by receiving a global navigation satellite system (GNSS) signal from a GNSS satellite (for example, a GPS signal from a global positioning system (GPS) satellite), and generates positional information including the latitude, longitude, and altitude of the vehicle. Incidentally, the positioning section 7640 may identify a current position by exchanging signals with a wireless access point, or may obtain the positional information from a terminal such as a mobile telephone, a personal handyphone system (PHS), or a smart phone that has a positioning function.

The beacon receiving section 7650, for example, receives a radio wave or an electromagnetic wave transmitted from a radio station installed on a road or the like, and thereby obtains information about the current position, congestion, a closed road, a necessary time, or the like. Incidentally, the function of the beacon receiving section 7650 may be included in the dedicated communication I/F 7630 described above.

The in-vehicle device I/F 7660 is a communication interface that mediates connection between the microcomputer 7610 and various in-vehicle devices 7760 present within the vehicle. The in-vehicle device I/F 7660 may establish wireless connection using a wireless communication protocol such as wireless LAN, Bluetooth (registered trademark), near field communication (NFC), or wireless universal serial bus (WUSB). In addition, the in-vehicle device I/F 7660 may establish wired connection by universal serial bus (USB), high-definition multimedia interface (HDMI (registered trademark)), mobile high-definition link (MHL), or the like via a connection terminal (and a cable if necessary) not depicted in the figures. The in-vehicle devices 7760 may, for example, include at least one of a mobile device and a wearable device possessed by an occupant and an information device carried into or attached to the vehicle. The in-vehicle devices 7760 may also include a navigation device that searches for a path to an arbitrary destination. The in-vehicle device I/F 7660 exchanges control signals or data signals with these in-vehicle devices 7760.

The vehicle-mounted network I/F 7680 is an interface that mediates communication between the microcomputer 7610 and the communication network 7010. The vehicle-mounted network I/F 7680 transmits and receives signals or the like in conformity with a predetermined protocol supported by the communication network 7010.

The microcomputer 7610 of the integrated control unit 7600 controls the vehicle control system 7000 in accordance with various kinds of programs on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. For example, the microcomputer 7610 may calculate a control target value for the driving force generating device, the steering mechanism, or the braking device on the basis of the obtained information about the inside and outside of the vehicle, and output a control command to the driving system control unit 7100. For example, the microcomputer 7610 may perform cooperative control intended to implement functions of an advanced driver assistance system (ADAS) which functions include collision avoidance or shock mitigation for the vehicle, following driving based on a following distance, vehicle speed maintaining driving, a warning of collision of the vehicle, a warning of deviation of the vehicle from a lane, or the like. In addition, the microcomputer 7610 may perform cooperative control intended for automatic driving, which makes the vehicle to travel autonomously without depending on the operation of the driver, or the like, by controlling the driving force generating device, the steering mechanism, the braking device, or the like on the basis of the obtained information about the surroundings of the vehicle.

The microcomputer 7610 may generate three-dimensional distance information between the vehicle and an object such as a surrounding structure, a person, or the like, and generate local map information including information about the surroundings of the current position of the vehicle, on the basis of information obtained via at least one of the general-purpose communication I/F 7620, the dedicated communication I/F 7630, the positioning section 7640, the beacon receiving section 7650, the in-vehicle device I/F 7660, and the vehicle-mounted network I/F 7680. In addition, the microcomputer 7610 may predict danger such as collision of the vehicle, approaching of a pedestrian or the like, an entry to a closed road, or the like on the basis of the obtained information, and generate a warning signal. The warning signal may, for example, be a signal for producing a warning sound or lighting a warning lamp.

The sound/image output section 7670 transmits an output signal of at least one of a sound and an image to an output device capable of visually or auditorily notifying information to an occupant of the vehicle or the outside of the vehicle. In the example of FIG. 24, an audio speaker 7710, a display section 7720, and an instrument panel 7730 are illustrated as the output device. The display section 7720 may, for example, include at least one of an on-board display and a head-up display. The display section 7720 may have an augmented reality (AR) display function. The output device may be other than these devices, and may be another device such as headphones, a wearable device such as an eyeglass type display worn by an occupant or the like, a projector, a lamp, or the like. In a case where the output device is a display device, the display device visually displays results obtained by various kinds of processing performed by the microcomputer 7610 or information received from another control unit in various forms such as text, an image, a table, a graph, or the like. In addition, in a case where the output device is an audio output device, the audio output device converts an audio signal constituted of reproduced audio data or sound data or the like into an analog signal, and auditorily outputs the analog signal.

Incidentally, at least two control units connected to each other via the communication network 7010 in the example depicted in FIG. 24 may be integrated into one control unit. Alternatively, each individual control unit may include a plurality of control units. Further, the vehicle control system 7000 may include another control unit not depicted in the figures. In addition, part or the whole of the functions performed by one of the control units in the above description may be assigned to another control unit. That is, predetermined arithmetic processing may be performed by any of the control units as long as information is transmitted and received via the communication network 7010. Similarly, a sensor or a device connected to one of the control units may be connected to another control unit, and a plurality of control units may mutually transmit and receive detection information via the communication network 7010.

Figure 26:
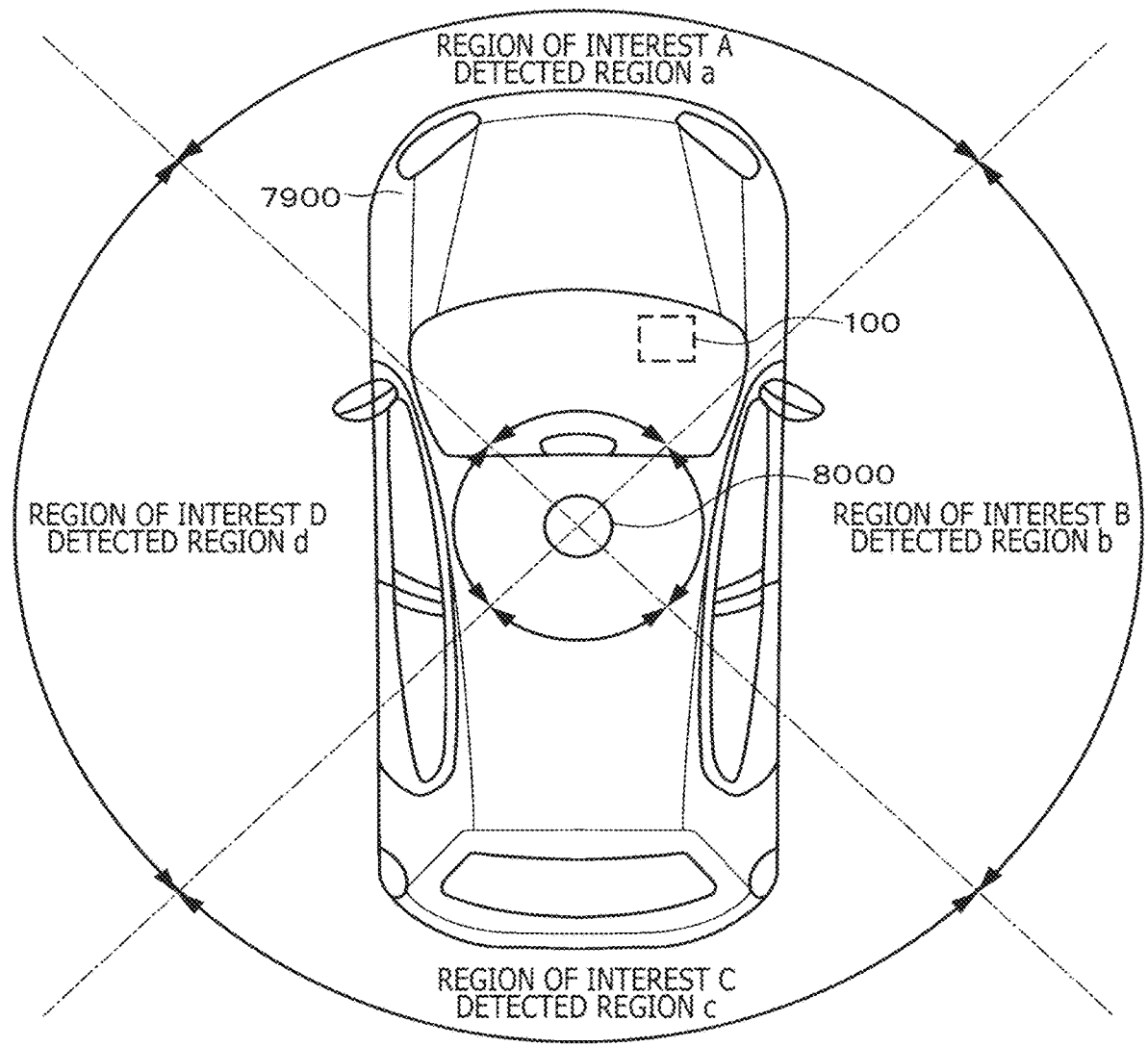
FIG. 26 is an explanatory diagram of a first example in which the present technology is applied to a vehicle.

FIG. 26 is a diagram depicting a first example in which the present technology is applied to the vehicle 7900 described above. A fisheye lens 8000 capable of capturing a video in a 360-degree direction is provided on a roof of the vehicle 7900. A system is configured such that the video captured by the fisheye lens 8000 is displayed on a monitor or an electronic mirror (hereinafter, referred to as a "monitor or the like") via the information processing device 100 provided within the vehicle 7900.

It is assumed that the video in the 360-degree direction captured by the fisheye lens 8000 is the input video, and that, for example, a region of interest at a 90-degree width in a front direction is the region of interest A, a region of interest at a 90-degree width in a side R direction is the region of interest B, a region of interest at a 90-degree width in a rear direction is the region of interest C, and a region of interest at a 90-degree width in an L side direction is a region of interest D. It is further assumed that a detected region at the 90-degree width in the front direction is the detected region a, a detected region at the 90-degree width in the R side direction is the detected region b, a detected region at the 90-degree width in the rear direction is the detected region c, and a detected region at the 90-degree width in the side L direction is a detected region d. The regions of interest and the detected regions are set in this way, and the video captured by the fisheye lens 8000 is processed by the information processing device 100 and displayed on the monitor or the like within the vehicle 7900.

With this configuration, for example, a video process similar to those in the first to third embodiments is performed with a person moving near the vehicle 7900 assumed as the object the feature amount of which is to be detected. Then, in a case in which the person is present in the front direction of the vehicle 7900, a video of the front direction of the vehicle 7900 can be displayed on the monitor or the like. In a case in which the person is present in the R side direction of the vehicle 7900, a video of the R side direction of the vehicle 7900 can be displayed on the monitor or the like. In a case in which the person is present in the rear direction of the vehicle 7900, a video of the rear direction of the vehicle 7900 can be displayed on the monitor or the like. In a case in which the person is present in the L side direction of the vehicle 7900, a video of the L side direction of the vehicle 7900 can be displayed on the monitor or the like. It is thereby possible to grasp a surrounding situation at a time of driving or stopping the vehicle 7900 in more detail and to improve safety.

Figure 27:
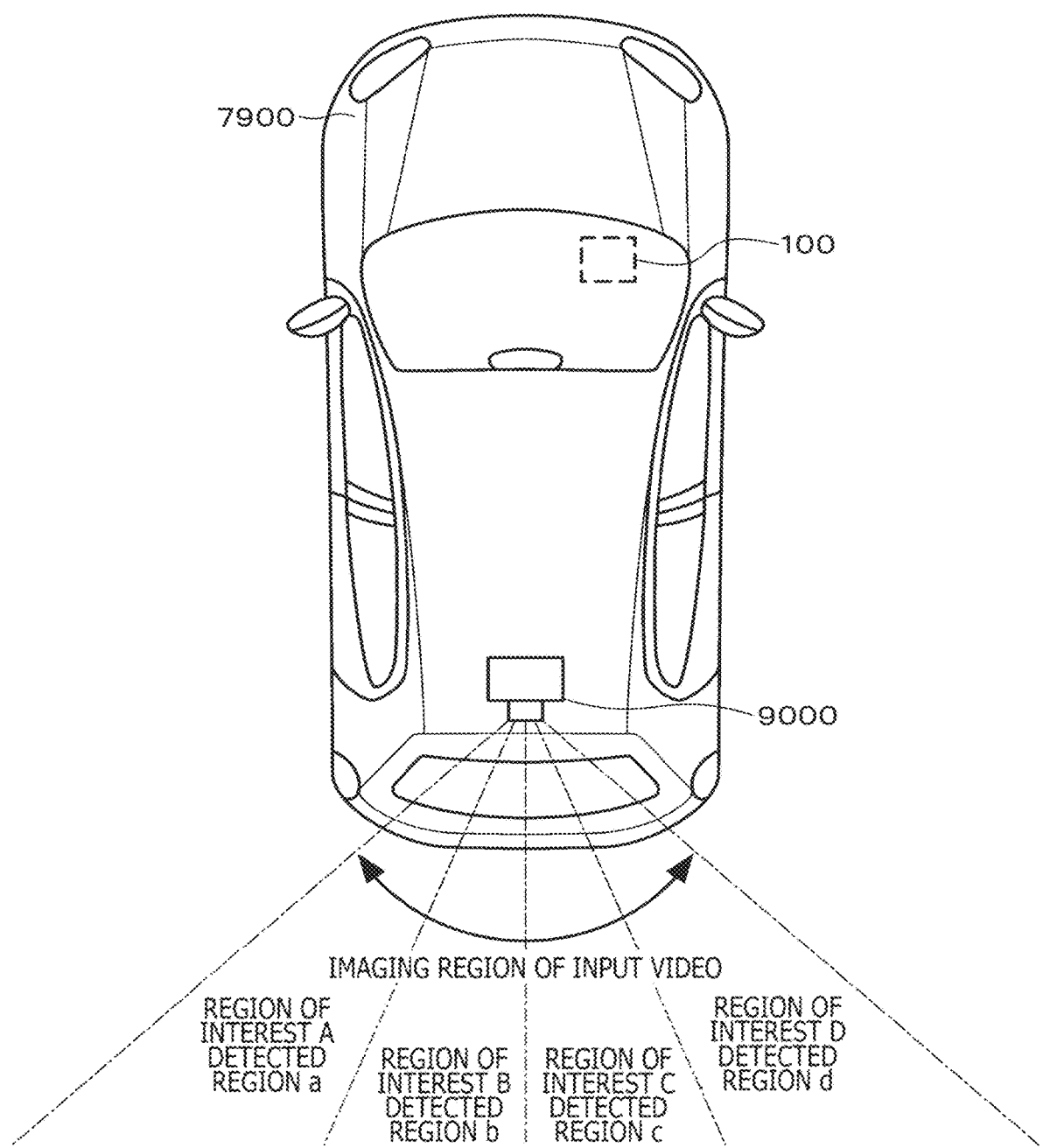
FIG. 27 is an explanatory diagram of a second example in which the present technology is applied to the vehicle.

In addition, it is also possible to use an input video from an imaging device capturing a video in one direction of the vehicle 7900. As in a second example of applying the present technology depicted in FIG. 27, a video captured by an imaging device 9000 in the rear direction of the vehicle 7900 is assumed as an input video, and the regions of interest A, B, C, and D can be displayed on the monitor or the like within the vehicle 7900. Such a mode of use is also applicable to imaging devices capturing videos in the front direction, the R side direction, and the L side direction.

Figure 28:
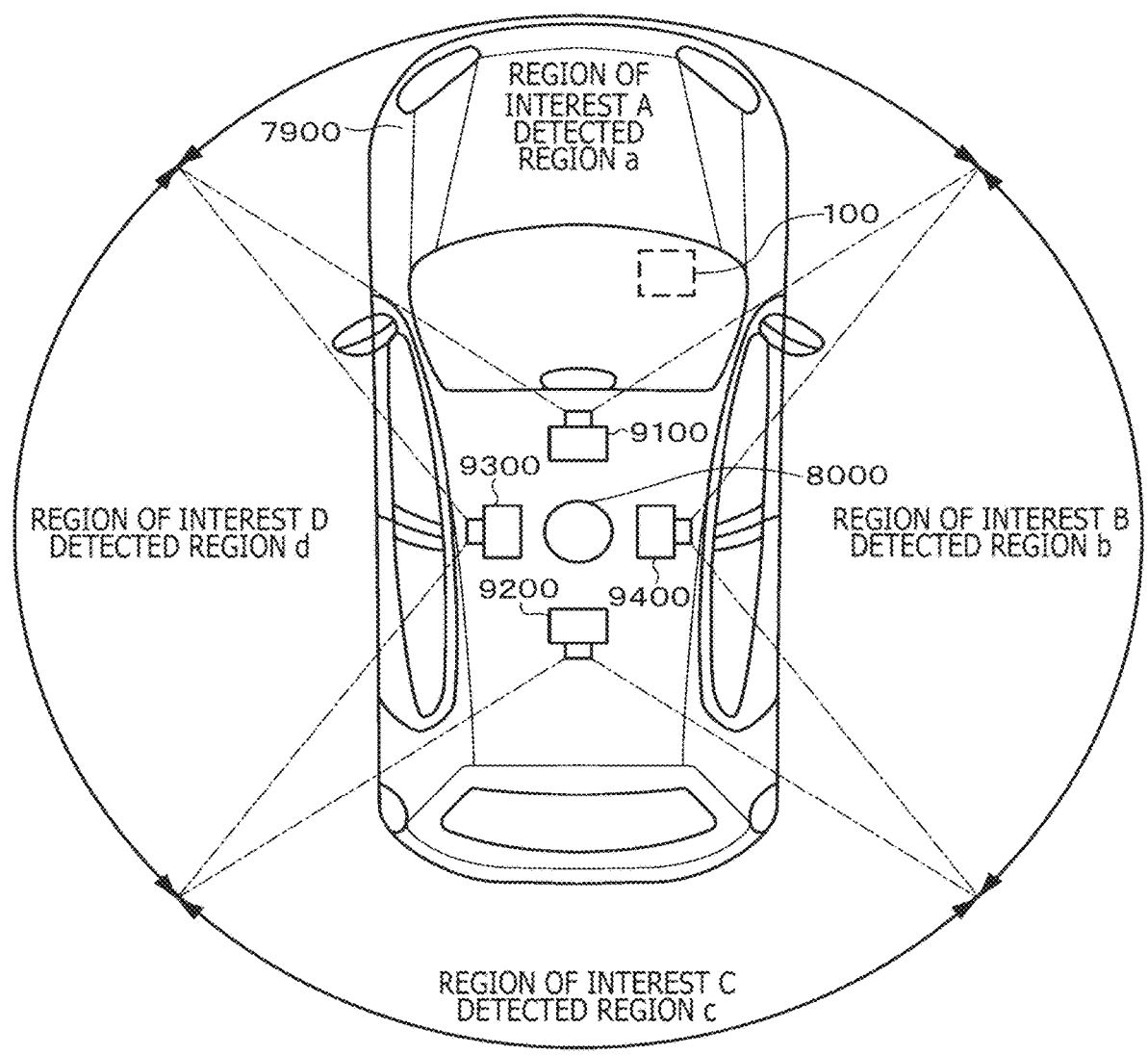
FIG. 28 is an explanatory diagram of a third example in which the present technology is applied to the vehicle.

In a case of applying the present technology to the vehicle as described above, the number of imaging devices is not limited to one and may be two or more. For example, as in a third example of applying the present technology to the vehicle depicted in FIG. 28, the fisheye lens 8000 capable of capturing a video in the 360-degree direction around the vehicle 7900, a first imaging device 9100 capturing a video in the front direction, a second imaging device 9200 capturing a video in the rear direction, a third imaging device 9300 capturing a video in the L side direction, and a fourth imaging device 9400 capturing a video in the R side direction may be provided. In this case, the feature amount of the object is detected from a 360-degree omnidirectional video captured by the fisheye lens 8000, and some of the videos captured by the first imaging device 9100, the second imaging device 9200, the third imaging device 9300, and the fourth imaging device 9400 are selected according to the feature amount, subjected to combining or the like, and displayed on the monitor or the like.

In a case of using a plurality of imaging devices, the number of imaging devices other than the fisheye lens capable of capturing a video in the 360-degree direction is not limited to four, and a combination of the imaging device for the L side direction and the imaging device for the R side direction may be used. Alternatively, a combination of the fisheye lens, the imaging device for the rear direction, the imaging device for the L side direction, and the imaging device for the R side direction may be used.

Moreover, the present technology is applicable not only to a vehicle but also to a mobile body such as a bicycle, a personal mobility, an airplane, a drone, a ship, a robot, a construction machine, and an agricultural machine (tractor.)

The present technology can also be configured as follows.

(1)

An information processing device, in which a region of interest in an imaging region is set; and a region to be displayed is determined from the region of interest according to a state of an object.

(2)

The information processing device according to (1), in which a detected region corresponding to the region of interest is set, and a plurality of the regions of interest are combined into the region to be displayed, on the basis of a feature amount of the object in the detected region.

(3)

The information processing device according to (2), in which the feature amount is a value based on the number of pixels configuring the object in the detected region.

(4)

The information processing device according to (2), in which in a state in which the object is present in any one detected region among a plurality of the detected regions, one of the regions of interest corresponding to the one detected region where the object is present is determined as the region to be displayed.

(5)

The information processing device according to (2), in which in a state in which the object is present in two or more detected regions among the plurality of the detected regions, two or more regions of interest among the plurality of regions of interest corresponding to the two or more detected regions where the object is present are combined and displayed.

(6)

The information processing device according to (2), in which the feature amount is a degree of a change in a case of a change in the object from one state to another state in the detected region.

(7)

The information processing device according to (6), in which the region of interest displayed and the region of interest corresponding to the detected region where a state of the subject changes are combined into the region to be displayed, according to the feature amount.

(8)

The information processing device according to (2), in which in a case of passage of a predetermined period of time in a state in which the object is present in two or more detected regions among the plurality of detected regions, two or more regions of interest among the plurality of regions of interest corresponding to the two or more detected regions are determined as the region to be displayed.

(9)

The information processing device according to (8), in which in the case of passage of the predetermined period of time in the state in which the object is present in the two detected regions, the two regions of interest are displayed in such a manner that a boundary between the two regions of interest corresponding to the two detected regions is located generally at a center of a display region of a display device.

(10)

The information processing device according to any one of (1) to (9), in which a projective transformation process is performed on the region of interest that does not meet face-to-face a lens of an imaging device imaging the imaging region, in an incident direction.

(11)

The information processing device according to any one of (2) to (10), in which the combining is performed per frame image configuring a video captured by imaging the imaging region.

(12)

The information processing device according to any one of (1) to (11), in which the imaging region is captured by one imaging device.

(13)

The information processing device according to (12), in which the imaging region includes a region where all the regions of interest are contained within an angle of view by the one imaging device.

(14)

The information processing device according to any one of (1) to (13), in which the imaging region is captured by a plurality of imaging devices.

(15)

The information processing device according to any one of (1) to (14), in which the object includes a subject detected in the imaging region.

(16)

The information processing device according to any one of (1) to (14), in which the object includes a subject designated in advance in the imaging region.

(17)

The information processing device according to any one of (1) to (16), in which an icon indicating the region of interest is displayed on a display device.

(18)

An information processing method including:

setting a region of interest in an imaging region; and determining a region to be displayed from the region of interest according to a state of an object.

(19)

An information processing program causing a computer to execute an information processing method including:

setting a region of interest in an imaging region; and determining a region to be displayed from the region of interest according to a state of an object.

REFERENCE SIGNS LIST

20: Imaging device
30: Display device
100: Information processing device

The invention claimed is:

1. An information processing device, comprising:
a processor configured to:
set a plurality of regions of interest in an imaging region;
set a detected region corresponding to each of the plurality of regions of interest; and
determine a region to be displayed from the plurality of regions of interest according to a state of an object among the plurality of detected regions, the region to be displayed being a portion of the imaging region less than the imaging region, wherein
in a case of passage of a predetermined period of time in a state in which the object is present inside two or more detected regions among the plurality of detected regions, the processor is configured to combine two or more of the plurality of regions of interest, respectively corresponding to the two or more detected regions where the object is present, as the region to be displayed on a basis of a feature amount of the object in the two or more detected regions, and
in a case in which the object is present inside only one of the two or more detected regions, the processor is configured to determine only the corresponding one of the two or more of the plurality of regions of interest wherein the object is present as the region to be displayed.

2. The information processing device according claim 1, wherein the feature amount is a value determined based on a number of pixels configuring the object in a respective detected region.

3. The information processing device according to claim 1, wherein in the state in which the object is present in the two or more detected regions among the plurality of detected regions, the processor is configured to sum image data of the two or more of the plurality of regions of interest, respectively corresponding to the two or more detected regions where the object is present, to form the region to be displayed.

4. The information processing device according to claim 3, wherein the processor is configured to sum the image data of the two or more of the plurality of regions of interest proportionally based upon the respective feature amounts of the object in the two or more detected regions where the object is present.

5. The information processing device according to claim 3, wherein the processor is configured to sum pixel values of corresponding points in the two or more of the plurality of regions of interest to form the region to be displayed.

6. The information processing device according to claim 1, wherein, in a case of a change in the object from one state to another state in a respective detected region, the feature amount is a degree of the change.

7. The information processing device according to claim 6, wherein the processor is configured to sum image data of a region of interest displayed and a region of interest corresponding to the respective detected region where the state of the object changes to form the region to be displayed according to the feature amount.

8. The information processing device according to claim 1, wherein in the case of passage of the predetermined period of time in the state in which the object is present in the two or more detected regions among the plurality of detected regions, the processor is configured to determine the two or more of the plurality of regions of interest, respectively corresponding to the two or more detected regions where the object is present, as the region to be displayed.

9. The information processing device according to claim 1, wherein in a case of passage of a predetermined period of time in a state in which the object is present in two detected regions, the processor is configured to display two regions of interest corresponding to the two detected regions in such a manner that a boundary between the two regions of interest is located generally at a center of a display region of a display device.

10. The information processing device according to claim 1, wherein the processor is configured to perform a projective transformation process on a region of interest that does not meet a lens of an imaging device imaging the imaging region face-to-face in an incident direction.

11. The information processing device according to claim 1, wherein the combining is performed per frame image configuring a video captured by imaging the imaging region.

12. The information processing device according to claim 1, wherein the imaging region is captured by one imaging device.

13. The information processing device according to claim 12, wherein the imaging region includes a region where all of the plurality of regions of interest are contained within an angle of view by the one imaging device.

14. The information processing device according to claim 1, wherein the imaging region is captured by a plurality of imaging devices.

15. The information processing device according to claim 1, wherein the object includes a subject detected in the imaging region.

16. The information processing device according to claim 1, wherein the object includes a subject designated in advance in the imaging region.

17. The information processing device according to claim 1, wherein an icon indicating at least one of the plurality of regions of interest is displayed on a display device.

18. An information processing method comprising:
setting a plurality of regions of interest in an imaging region;
setting a detected region corresponding to each of the plurality of regions of interest;
determining a region to be displayed from the plurality of regions of interest according to a state of an object among the plurality of detected regions, the region to be displayed being a portion of the imaging region less than the imaging region;
in a case of passage of a predetermined period of time in a state in which the object is present inside two or more detected regions among the plurality of detected regions, combining two or more of the plurality of regions of interest, respectively corresponding to the two or more detected regions where the object is present, as the region to be displayed on a basis of a feature amount of the object in the two or more detected regions; and
in a case in which the object is present inside only one of the two or more detected regions, determining only the corresponding one of the two or more of the plurality of regions of interest wherein the object is present as the region to be displayed on the basis of the feature amount of the object in the one of the two or more detection regions.

19. A non-transitory medium storing an information processing program causing a computer to execute an information processing method comprising:
setting a plurality of regions of interest in an imaging region;
setting a detected region corresponding to each of the plurality of regions of interest;
determining a region to be displayed from the plurality of regions of interest according to a state of an object among the plurality of detected regions, the region to be displayed being a portion of the imaging region less than the imaging region;
in a case of passage of a predetermined period of time in a state in which the object is present inside two or more detected regions among the plurality of detected regions, combining two or more of the plurality of regions of interest, respectively corresponding to the two or more detected regions where the object is present, as the region to be displayed on a basis of a feature amount of the object in the two or more detected regions; and
in a case in which the object is present inside only one of the two or more detected regions, determining only the corresponding one of the two or more of the plurality of regions of interest wherein the object is present as the region to be displayed on the basis of the feature amount of the object in the one of the two or more detection regions.

* * * * *